US008751391B2

(12) United States Patent
Freund

(10) Patent No.: US 8,751,391 B2
(45) Date of Patent: Jun. 10, 2014

(54) SYSTEM AND PROCESS FOR PERFORMING PURCHASE TRANSACTIONS USING TOKENS

(75) Inventor: Peter C. Freund, New York, NY (US)

(73) Assignee: JPMorgan Chase Bank, N.A., New York, NY (US)

(*) Notice: Subject to any disclaimer, the term of this patent is extended or adjusted under 35 U.S.C. 154(b) by 2166 days.

(21) Appl. No.: 10/401,749

(22) Filed: Mar. 31, 2003

(65) Prior Publication Data

US 2003/0187787 A1 Oct. 2, 2003

Related U.S. Application Data

(60) Provisional application No. 60/368,155, filed on Mar. 29, 2002.

(51) Int. Cl.
*G06Q 40/00* (2012.01)
*G06Q 20/40* (2012.01)
*H04L 9/32* (2006.01)
*G06Q 20/30* (2012.01)
*G06Q 20/02* (2012.01)

(52) U.S. Cl.
CPC .............. *G06Q 20/40* (2013.01); *H04L 9/3234* (2013.01); *G06Q 20/30* (2013.01); *G06Q 20/02* (2013.01)
USPC ................... 705/41; 705/35; 705/39; 705/44

(58) Field of Classification Search
CPC ..... G06Q 20/40; G06Q 9/3234; G06Q 20/30; G06Q 20/02
USPC ......................... 705/41, 35, 39, 44
See application file for complete search history.

(56) References Cited

U.S. PATENT DOCUMENTS

| 3,230,650 A | 1/1966 | Orkin |
| 3,634,669 A | 1/1972 | Soumas et al. |
| 3,713,235 A | 1/1973 | Roberts |
| 3,855,033 A | 12/1974 | Staats |
| 3,938,090 A | 2/1976 | Borison et al. |
| 3,946,206 A | 3/1976 | Darjany |
| 4,022,943 A | 5/1977 | Erb et al. |

(Continued)

FOREIGN PATENT DOCUMENTS

| CA | 2293321 | 12/1998 |
| EP | 0597316 | 5/1994 |

(Continued)

OTHER PUBLICATIONS

Anonymous, "Two chips can be better than one", Card Technology; New York, May 2001, p. 40, 2pgs.*

(Continued)

*Primary Examiner* — Thomas M Hammond, III
*Assistant Examiner* — John Scarito
(74) *Attorney, Agent, or Firm* — Hunton & Williams LLP

(57) ABSTRACT

The invention relates to a method and process by which an existing and large network of devices can be used by consumers to authenticate themselves, and permits each consumer to apply any of the various payments mechanisms available to him. The existing broadly distributed network is active and passive radio frequency identification ("RFID") devices held by consumers. Various types of accounts are linked to devices and allow users to perform various purchase transactions, as well as non-financial transactions.

12 Claims, 4 Drawing Sheets

(56) References Cited

U.S. PATENT DOCUMENTS

| | | |
|---|---|---|
| 4,047,033 A | 9/1977 | Malmberg et al. |
| 4,058,220 A | 11/1977 | Torongo |
| D248,203 S | 6/1978 | Morse |
| 4,123,747 A | 10/1978 | Lancto et al. |
| 4,130,881 A | 12/1978 | Haessler et al. |
| 4,205,780 A | 6/1980 | Burns |
| 4,254,474 A | 3/1981 | Cooper et al. |
| D259,048 S | 4/1981 | Peterson |
| 4,264,808 A | 4/1981 | Owens et al. |
| 4,321,672 A | 3/1982 | Braun et al. |
| 4,338,587 A * | 7/1982 | Chiappetti .................... 340/928 |
| 4,346,442 A | 8/1982 | Musmanno |
| 4,355,372 A | 10/1982 | Goldberg |
| 4,376,978 A | 3/1983 | Musmanno |
| 4,380,699 A | 4/1983 | Monnier et al. |
| 4,453,074 A | 6/1984 | Weinstein |
| 4,454,414 A | 6/1984 | Benton |
| 4,465,206 A | 8/1984 | Sorel et al. |
| 4,479,995 A | 10/1984 | Suzuki et al. |
| 4,545,838 A | 10/1985 | Minkus et al. |
| 4,575,127 A | 3/1986 | Michel |
| 4,575,621 A | 3/1986 | Dreifus |
| 4,597,046 A | 6/1986 | Musmanno et al. |
| 4,598,367 A | 7/1986 | DeFrancesco et al. |
| 4,605,844 A | 8/1986 | Haggan |
| 4,614,861 A | 9/1986 | Pavlov et al. |
| 4,634,845 A | 1/1987 | Riley |
| 4,642,768 A | 2/1987 | Roberts |
| 4,643,452 A | 2/1987 | Chang |
| 4,647,714 A | 3/1987 | Goto |
| 4,648,189 A | 3/1987 | Michel |
| 4,650,981 A | 3/1987 | Foletta |
| 4,669,730 A | 6/1987 | Small |
| 4,674,042 A | 6/1987 | Hernandez et al. |
| 4,674,044 A | 6/1987 | Kalmus et al. |
| 4,697,072 A | 9/1987 | Kawana |
| 4,700,055 A | 10/1987 | Kashkashian, Jr. |
| 4,701,601 A | 10/1987 | Francini et al. |
| 4,707,594 A | 11/1987 | Roth |
| 4,723,212 A | 2/1988 | O'Brien |
| 4,736,294 A | 4/1988 | Le Grand |
| 4,739,478 A | 4/1988 | Roberts et al. |
| 4,747,620 A | 5/1988 | Kay et al. |
| 4,750,119 A | 6/1988 | Robertson |
| 4,752,676 A | 6/1988 | Leonard et al. |
| 4,755,661 A | 7/1988 | Ruebsam |
| 4,760,604 A | 7/1988 | Cooper |
| 4,766,539 A | 8/1988 | Fox |
| 4,774,663 A | 9/1988 | Musmanno et al. |
| 4,777,563 A | 10/1988 | Teraoka et al. |
| 4,789,928 A | 12/1988 | Fujisaki |
| 4,817,949 A | 4/1989 | Bachman et al. |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,845,347 A | 7/1989 | McCrindle |
| 4,851,650 A | 7/1989 | Kitade |
| 4,856,857 A | 8/1989 | Takeuchi et al. |
| 4,859,187 A | 8/1989 | Peterson |
| 4,859,837 A * | 8/1989 | Halpern ........................ 235/380 |
| 4,866,545 A | 9/1989 | LaManna et al. |
| 4,866,634 A | 9/1989 | Reboh |
| 4,870,259 A | 9/1989 | Boggan et al. |
| 4,882,675 A | 11/1989 | Nichtberger et al. |
| 4,897,533 A | 1/1990 | Lyszczarz |
| 4,897,811 A | 1/1990 | Scofield |
| D305,887 S | 2/1990 | Nishimura |
| 4,903,201 A | 2/1990 | Wagner |
| 4,906,826 A | 3/1990 | Spencer |
| 4,908,521 A | 3/1990 | Boggan et al. |
| 4,910,672 A | 3/1990 | Off |
| 4,928,001 A | 5/1990 | Masada |
| 4,931,623 A | 6/1990 | Nakamura et al. |
| 4,938,830 A | 7/1990 | Cannistra |
| 4,941,090 A | 7/1990 | McCarthy |
| 4,943,707 A | 7/1990 | Boggan |
| 4,948,174 A | 8/1990 | Thomson et al. |
| 4,953,085 A | 8/1990 | Atkins |
| D310,386 S | 9/1990 | Michels et al. |
| 4,954,985 A | 9/1990 | Yamazaki |
| 4,961,142 A | 10/1990 | Elliott et al. |
| 4,968,873 A | 11/1990 | Dethloff et al. |
| 4,972,504 A | 11/1990 | Daniel, Jr. |
| 4,975,840 A | 12/1990 | DeTore et al. |
| 4,977,501 A | 12/1990 | Lefevre |
| 4,978,401 A | 12/1990 | Bonomi |
| 4,992,940 A | 2/1991 | Dworkin |
| 5,025,139 A | 6/1991 | Halliburton, Jr. |
| 5,025,372 A | 6/1991 | Burton et al. |
| 5,041,972 A | 8/1991 | Frost |
| 5,049,728 A | 9/1991 | Rovin |
| 5,054,096 A | 10/1991 | Beizer |
| 5,072,380 A | 12/1991 | Randelman et al. |
| 5,093,907 A | 3/1992 | Hwong et al. |
| 5,095,194 A | 3/1992 | Barbanell |
| 5,117,355 A | 5/1992 | McCarthy |
| 5,121,945 A | 6/1992 | Thomson et al. |
| 5,122,950 A | 6/1992 | Mee |
| 5,146,068 A | 9/1992 | Ugawa et al. |
| 5,163,098 A | 11/1992 | Dahbura |
| 5,173,851 A | 12/1992 | Off et al. |
| 5,175,416 A | 12/1992 | Mansvelt |
| 5,175,682 A | 12/1992 | Higashiyama |
| 5,177,342 A | 1/1993 | Adams |
| 5,180,901 A | 1/1993 | Hiramatsu |
| 5,185,697 A | 2/1993 | Jacobs et al. |
| 5,187,750 A | 2/1993 | Behera |
| 5,191,522 A | 3/1993 | Bosco et al. |
| 5,192,947 A | 3/1993 | Neustein |
| 5,201,010 A | 4/1993 | Gabriel |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,220,500 A | 6/1993 | Baird |
| 5,220,501 A | 6/1993 | Lawlor |
| 5,227,874 A | 7/1993 | Von Kohorn |
| 5,231,571 A | 7/1993 | D'Agostino |
| 5,237,620 A | 8/1993 | Deaton |
| 5,239,462 A | 8/1993 | Jones |
| 5,245,535 A | 9/1993 | Weiss et al. |
| 5,257,486 A | 11/1993 | Holmwall |
| 5,276,728 A | 1/1994 | Pagliaroli et al. |
| 5,278,751 A | 1/1994 | Adiano |
| 5,287,268 A | 2/1994 | McCarthy |
| 5,287,269 A | 2/1994 | Dorrough et al. |
| 5,297,026 A | 3/1994 | Hoffman |
| 5,297,032 A | 3/1994 | Trojan et al. |
| 5,305,196 A | 4/1994 | Deaton et al. |
| 5,311,594 A | 5/1994 | Penzias |
| 5,321,933 A | 6/1994 | Seifert et al. |
| 5,326,959 A | 7/1994 | Perazza |
| 5,326,960 A | 7/1994 | Tannenbaum |
| 5,327,508 A | 7/1994 | Deaton et al. |
| 5,339,239 A | 8/1994 | Manabe et al. |
| 5,349,633 A | 9/1994 | Katz |
| 5,350,906 A | 9/1994 | Brody et al. |
| 5,351,187 A * | 9/1994 | Hassett ........................... 705/13 |
| 5,352,877 A | 10/1994 | Morley |
| 5,361,062 A | 11/1994 | Weiss et al. |
| 5,365,575 A | 11/1994 | Katz |
| 5,380,046 A | 1/1995 | Stephens |
| 5,381,470 A | 1/1995 | Cambray et al. |
| 5,382,784 A | 1/1995 | Eberhardt |
| 5,383,113 A | 1/1995 | Kight |
| 5,383,687 A | 1/1995 | Suess et al. |
| 5,388,165 A | 2/1995 | Gabriel |
| 5,396,621 A | 3/1995 | MacGregor et al. |
| 5,397,881 A | 3/1995 | Mannik |
| RE34,915 E | 4/1995 | Nichtberger et al. |
| 5,409,092 A | 4/1995 | Itako et al. |

(56) References Cited

U.S. PATENT DOCUMENTS

| | | |
|---|---|---|
| 5,412,190 A | 5/1995 | Kopesec |
| 5,412,192 A | 5/1995 | Hoss |
| 5,413,341 A | 5/1995 | Lieberman |
| 5,424,524 A | 6/1995 | Ruppert et al. |
| 5,430,644 A | 7/1995 | Deaton et al. |
| 5,432,326 A | 7/1995 | Noblett et al. |
| 5,440,108 A | 8/1995 | Tran et al. |
| 5,444,794 A | 8/1995 | Uhland |
| 5,444,844 A | 8/1995 | Inoue |
| 5,448,471 A | 9/1995 | Deaton et al. |
| 5,450,477 A | 9/1995 | Amarant et al. |
| 5,450,491 A | 9/1995 | McNair |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Henry |
| 5,466,920 A | 11/1995 | Nair et al. |
| 5,471,669 A | 11/1995 | Lidman |
| 5,477,038 A | 12/1995 | Levine et al. |
| 5,477,040 A | 12/1995 | LaLonde |
| 5,481,094 A | 1/1996 | Suda |
| 5,481,647 A | 1/1996 | Brody |
| 5,482,139 A | 1/1996 | Rivalto |
| 5,483,444 A | 1/1996 | Malark |
| 5,483,445 A | 1/1996 | Pickering |
| 5,489,123 A | 2/1996 | Roshkoff |
| 5,490,060 A | 2/1996 | Malec |
| 5,495,981 A | 3/1996 | Warther |
| 5,500,514 A | 3/1996 | Veeneman et al. |
| 5,500,890 A | 3/1996 | Rogge et al. |
| 5,502,805 A | 3/1996 | Anderson et al. |
| 5,503,891 A | 4/1996 | Marshall et al. |
| 5,513,102 A | 4/1996 | Auriemma |
| 5,523,942 A | 6/1996 | Tyler |
| 5,530,232 A | 6/1996 | Taylor |
| 5,532,689 A | 7/1996 | Bueno |
| 5,537,314 A | 7/1996 | Kanter |
| 5,541,583 A | 7/1996 | Mandelbaum |
| 5,544,086 A | 8/1996 | Davis et al. |
| 5,546,446 A | 8/1996 | Tsunokawa et al. |
| 5,550,734 A | 8/1996 | Tater |
| 5,551,021 A | 8/1996 | Harada |
| 5,553,120 A | 9/1996 | Katz |
| 5,557,092 A | 9/1996 | Ackley et al. |
| 5,557,516 A | 9/1996 | Hogan |
| 5,563,934 A | 10/1996 | Eda |
| 5,578,808 A | 11/1996 | Taylor |
| 5,581,064 A | 12/1996 | Riley et al. |
| 5,583,778 A | 12/1996 | Wind |
| 5,583,933 A | 12/1996 | Mark |
| 5,585,787 A | 12/1996 | Wallerstein |
| 5,592,560 A | 1/1997 | Deaton et al. |
| 5,592,590 A | 1/1997 | Jolly |
| 5,603,025 A | 2/1997 | Tabb |
| 5,604,542 A | 2/1997 | Dedrick |
| 5,606,496 A | 2/1997 | D'Agostino |
| 5,608,785 A | 3/1997 | Kasday |
| 5,611,052 A | 3/1997 | Dykstra |
| 5,612,868 A | 3/1997 | Off et al. |
| 5,615,109 A | 3/1997 | Eder |
| 5,615,341 A | 3/1997 | Srikant |
| 5,617,474 A | 4/1997 | Ditzig et al. |
| 5,619,558 A | 4/1997 | Jheeta |
| 5,621,812 A | 4/1997 | Deaton et al. |
| 5,623,591 A | 4/1997 | Cseri |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,116 A | 7/1997 | McCoy |
| 5,649,117 A | 7/1997 | Landry |
| 5,649,118 A | 7/1997 | Carlisle et al. |
| 5,650,604 A | 7/1997 | Marcous et al. |
| 5,652,786 A | 7/1997 | Rogers |
| 5,653,914 A | 8/1997 | Holmes et al. |
| 5,655,085 A | 8/1997 | Ryan |
| 5,657,388 A * | 8/1997 | Weiss .......................... 713/185 |
| 5,657,437 A | 8/1997 | Bishop et al. |
| 5,657,460 A | 8/1997 | Egan et al. |
| 5,659,469 A | 8/1997 | Deaton et al. |
| 5,659,741 A | 8/1997 | Eberhardt |
| 5,664,110 A | 9/1997 | Green et al. |
| 5,664,127 A | 9/1997 | Anderson et al. |
| 5,665,953 A | 9/1997 | Mazzamuto |
| 5,671,363 A | 9/1997 | Cristofich et al. |
| 5,675,607 A | 10/1997 | Alesio et al. |
| 5,675,662 A | 10/1997 | Deaton et al. |
| 5,675,746 A | 10/1997 | Marshall |
| 5,677,521 A | 10/1997 | Garrou |
| 5,677,955 A | 10/1997 | Doggett et al. |
| 5,680,459 A | 10/1997 | Hook et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,704,046 A | 12/1997 | Hogan |
| 5,705,798 A | 1/1998 | Tarbox |
| 5,708,422 A | 1/1998 | Blonder et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,399 A | 2/1998 | Bezos |
| 5,717,865 A | 2/1998 | Stratmann |
| 5,717,925 A | 2/1998 | Harper et al. |
| 5,721,768 A | 2/1998 | Stimson et al. |
| 5,721,847 A | 2/1998 | Johnson |
| 5,726,884 A | 3/1998 | Sturgeon et al. |
| 5,727,153 A | 3/1998 | Powell |
| 5,727,161 A | 3/1998 | Purcell, Jr. |
| 5,728,998 A | 3/1998 | Novis et al. |
| 5,729,693 A | 3/1998 | Holda-Fleck |
| 5,732,136 A | 3/1998 | Murphree et al. |
| 5,732,397 A | 3/1998 | DeTore |
| 5,734,838 A | 3/1998 | Robinson |
| 5,737,421 A | 4/1998 | Audebert |
| 5,740,549 A | 4/1998 | Reilly et al. |
| 5,742,775 A | 4/1998 | King |
| 5,744,787 A | 4/1998 | Teicher |
| 5,745,049 A | 4/1998 | Akiyama et al. |
| 5,745,555 A | 4/1998 | Mark |
| 5,745,706 A | 4/1998 | Wolfberg et al. |
| 5,748,737 A | 5/1998 | Daggar |
| 5,749,075 A | 5/1998 | Toader et al. |
| 5,758,328 A | 5/1998 | Giovannoli |
| 5,764,923 A | 6/1998 | Tallman et al. |
| 5,765,138 A | 6/1998 | Aycock et al. |
| 5,765,141 A | 6/1998 | Spector |
| 5,765,144 A | 6/1998 | Larche |
| 5,768,158 A | 6/1998 | Adler et al. |
| 5,770,843 A | 6/1998 | Rose et al. |
| 5,770,849 A | 6/1998 | Novis et al. |
| 5,774,870 A | 6/1998 | Storey |
| 5,774,878 A | 6/1998 | Marshall |
| 5,774,882 A | 6/1998 | Keen |
| 5,774,883 A | 6/1998 | Andersen et al. |
| 5,777,305 A | 7/1998 | Smith et al. |
| 5,778,067 A | 7/1998 | Jones et al. |
| 5,787,156 A | 7/1998 | Katz |
| 5,787,403 A | 7/1998 | Randle |
| 5,787,404 A | 7/1998 | Fernandez-Holmann |
| 5,789,733 A | 8/1998 | Jachimowicz et al. |
| 5,790,636 A | 8/1998 | Marshall |

(56) References Cited

U.S. PATENT DOCUMENTS

| | | |
|---|---|---|
| 5,794,207 A | 8/1998 | Walker |
| 5,796,827 A | 8/1998 | Coppersmith et al. |
| 5,797,133 A | 8/1998 | Jones |
| 5,798,950 A | 8/1998 | Fitzgerald |
| 5,799,087 A | 8/1998 | Rosen |
| 5,799,286 A | 8/1998 | Morgan et al. |
| 5,802,176 A | 9/1998 | Audebert |
| 5,802,502 A | 9/1998 | Gell |
| 5,805,719 A | 9/1998 | Pare et al. |
| 5,806,042 A | 9/1998 | Kelly et al. |
| 5,806,044 A | 9/1998 | Powell |
| 5,806,047 A | 9/1998 | Hackel et al. |
| 5,809,478 A | 9/1998 | Greco |
| 5,812,968 A | 9/1998 | Hassan |
| 5,814,796 A | 9/1998 | Benson et al. |
| 5,815,657 A | 9/1998 | Williams et al. |
| 5,819,234 A | 10/1998 | Slavin et al. |
| 5,819,237 A | 10/1998 | Garman |
| 5,825,871 A | 10/1998 | Mark |
| 5,826,243 A | 10/1998 | Musmanno et al. |
| 5,832,090 A | 11/1998 | Raspotnik |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,842,178 A | 11/1998 | Giovannoli |
| 5,845,259 A | 12/1998 | West et al. |
| 5,845,260 A | 12/1998 | Nakano et al. |
| 5,848,400 A | 12/1998 | Chang |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,456 A | 2/1999 | Rogers |
| 5,870,718 A | 2/1999 | Spector |
| 5,870,721 A | 2/1999 | Norris |
| 5,873,096 A | 2/1999 | Lim |
| 5,875,437 A | 2/1999 | Atkins |
| 5,877,975 A | 3/1999 | Jigour et al. |
| 5,878,258 A | 3/1999 | Pizi |
| 5,878,403 A | 3/1999 | Agrawal |
| 5,883,377 A | 3/1999 | Chapin, Jr. |
| 5,883,810 A | 3/1999 | Franklin et al. |
| 5,884,278 A | 3/1999 | Powell |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| D408,054 S | 4/1999 | Leedy, Jr. |
| 5,897,620 A | 4/1999 | Walker et al. |
| 5,897,621 A | 4/1999 | Boesch et al. |
| 5,901,303 A | 5/1999 | Chew |
| 5,903,879 A | 5/1999 | Mitchell |
| 5,905,246 A | 5/1999 | Fajkowski |
| 5,907,142 A | 5/1999 | Kelsey |
| 5,907,350 A | 5/1999 | Nemirofsky |
| 5,911,135 A | 6/1999 | Atkins |
| 5,911,136 A | 6/1999 | Atkins |
| 5,913,202 A | 6/1999 | Motoyama |
| 5,914,472 A | 6/1999 | Foladare et al. |
| 5,918,217 A | 6/1999 | Maggioncalda |
| 5,920,629 A | 7/1999 | Rosen |
| 5,920,847 A | 7/1999 | Kolling et al. |
| 5,920,848 A | 7/1999 | Schutzer et al. |
| 5,923,734 A | 7/1999 | Taskett |
| 5,926,792 A | 7/1999 | Koppes et al. |
| 5,926,800 A | 7/1999 | Baronowski et al. |
| 5,928,082 A | 7/1999 | Clapper, Jr. |
| 5,930,217 A | 7/1999 | Kayanuma |
| 5,930,775 A | 7/1999 | McCauley |
| 5,931,764 A | 8/1999 | Freeman et al. |
| 5,933,817 A | 8/1999 | Hucal |
| 5,936,221 A | 8/1999 | Corder et al. |
| 5,937,068 A | 8/1999 | Audebert |
| 5,940,811 A | 8/1999 | Norris |
| 5,940,812 A | 8/1999 | Tengel et al. |
| 5,946,669 A | 8/1999 | Polk |
| 5,949,044 A | 9/1999 | Walker et al. |
| 5,950,175 A | 9/1999 | Austin |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,956,695 A | 9/1999 | Carrithers et al. |
| 5,960,411 A | 9/1999 | Hartman et al. |
| 5,963,648 A | 10/1999 | Rosen |
| 5,963,925 A | 10/1999 | Kolling et al. |
| 5,963,953 A | 10/1999 | Cram et al. |
| 5,970,467 A | 10/1999 | Alavi |
| 5,970,469 A | 10/1999 | Scroggie et al. |
| 5,970,478 A | 10/1999 | Walker et al. |
| 5,970,479 A | 10/1999 | Shepherd |
| 5,970,480 A | 10/1999 | Kalina |
| 5,974,396 A | 10/1999 | Anderson |
| 5,974,399 A | 10/1999 | Giuliani et al. |
| RE36,365 E | 11/1999 | Levine et al. |
| 5,978,779 A | 11/1999 | Stein et al. |
| 5,979,757 A | 11/1999 | Tracy |
| 5,983,206 A | 11/1999 | Oppenheimer |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,736 A | 11/1999 | Ferguson et al. |
| 5,991,741 A | 11/1999 | Speakman et al. |
| 5,991,743 A | 11/1999 | Irving et al. |
| 5,991,748 A | 11/1999 | Taskett |
| 5,991,750 A | 11/1999 | Watson |
| 5,995,942 A | 11/1999 | Smith et al. |
| 5,999,596 A | 12/1999 | Walker et al. |
| 5,999,624 A | 12/1999 | Hopkins |
| 5,999,907 A | 12/1999 | Donner |
| 5,999,917 A | 12/1999 | Facciani et al. |
| 6,000,608 A | 12/1999 | Dorf |
| 6,000,832 A | 12/1999 | Franklin et al. |
| 6,003,762 A | 12/1999 | Hayashida |
| 6,006,205 A | 12/1999 | Loeb et al. |
| 6,006,988 A | 12/1999 | Behrmann et al. |
| 6,008,817 A | 12/1999 | Gilmore, Jr. |
| 6,009,415 A | 12/1999 | Shurling et al. |
| 6,014,634 A | 1/2000 | Scroggie et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,482 A | 1/2000 | Molinari et al. |
| 6,016,954 A | 1/2000 | Abe et al. |
| 6,018,718 A | 1/2000 | Walker et al. |
| 6,018,722 A | 1/2000 | Ray et al. |
| 6,021,189 A | 2/2000 | Vu |
| 6,021,397 A | 2/2000 | Jones et al. |
| 6,025,283 A | 2/2000 | Roberts |
| 6,025,774 A | 2/2000 | Forbes |
| 6,026,370 A | 2/2000 | Jermyn |
| 6,029,139 A | 2/2000 | Cunningham et al. |
| 6,029,144 A | 2/2000 | Barrett et al. |
| 6,029,153 A | 2/2000 | Bauchner et al. |
| 6,029,195 A | 2/2000 | Herz |
| 6,029,890 A | 2/2000 | Austin |
| 6,032,125 A | 2/2000 | Ando |
| 6,032,136 A | 2/2000 | Brake, Jr. et al. |
| 6,032,859 A | 3/2000 | Muehlberger et al. |
| 6,036,099 A | 3/2000 | Leighton |
| 6,038,292 A | 3/2000 | Thomas |
| 6,038,552 A | 3/2000 | Fleischl et al. |

(56) References Cited

U.S. PATENT DOCUMENTS

| | | | |
|---|---|---|---|
| 6,041,314 A | 3/2000 | Davis | |
| 6,041,315 A | 3/2000 | Pollin | |
| 6,044,360 A | 3/2000 | Picciallo | |
| 6,044,371 A | 3/2000 | Person et al. | |
| 6,045,050 A | 4/2000 | Ippolito et al. | |
| 6,047,067 A | 4/2000 | Rosen | |
| 6,047,268 A | 4/2000 | Bartoli et al. | |
| 6,048,271 A | 4/2000 | Barcelou | |
| 6,049,773 A | 4/2000 | McCormack et al. | |
| 6,049,782 A | 4/2000 | Gottesman et al. | |
| 6,055,510 A | 4/2000 | Henrick | |
| 6,055,517 A | 4/2000 | Friend et al. | |
| 6,055,573 A | 4/2000 | Gardenswartz et al. | |
| 6,058,378 A | 5/2000 | Clark et al. | |
| 6,061,660 A | 5/2000 | Eggleston et al. | |
| 6,064,985 A | 5/2000 | Anderson | |
| 6,065,675 A | 5/2000 | Teicher | |
| 6,068,183 A | 5/2000 | Freeman et al. | |
| 6,070,067 A | 5/2000 | Nguyen et al. | |
| 6,070,147 A | 5/2000 | Harms et al. | |
| 6,070,153 A | 5/2000 | Simpson | |
| D427,167 S | 6/2000 | Iwasaki | |
| 6,073,115 A | 6/2000 | Marshall | |
| 6,076,068 A | 6/2000 | DeLapa et al. | |
| 6,076,072 A | 6/2000 | Libman | |
| 6,078,888 A | 6/2000 | Johnson, Jr. | |
| 6,078,891 A | 6/2000 | Riordan et al. | |
| 6,078,892 A | 6/2000 | Anderson et al. | |
| 6,078,901 A | 6/2000 | Ching | |
| 6,085,976 A * | 7/2000 | Sehr | 235/384 |
| 6,088,686 A | 7/2000 | Walker et al. | |
| 6,089,284 A * | 7/2000 | Kaehler et al. | 141/94 |
| 6,092,050 A | 7/2000 | Lungren et al. | |
| 6,092,056 A | 7/2000 | Tull, Jr. et al. | |
| 6,092,057 A | 7/2000 | Zimmermann et al. | |
| 6,095,416 A | 8/2000 | Grant et al. | |
| 6,097,391 A | 8/2000 | Wilcox | |
| 6,098,053 A | 8/2000 | Slater | |
| 6,105,006 A | 8/2000 | Davis et al. | |
| 6,105,007 A | 8/2000 | Norris | |
| 6,105,008 A | 8/2000 | Davis et al. | |
| 6,105,009 A | 8/2000 | Cuervo | |
| 6,105,011 A | 8/2000 | Morrison, Jr. | |
| 6,105,865 A | 8/2000 | Hardesty | |
| 6,108,641 A | 8/2000 | Kenna et al. | |
| 6,109,525 A | 8/2000 | Blomqvist et al. | |
| 6,112,190 A | 8/2000 | Fletcher et al. | |
| 6,112,191 A | 8/2000 | Burke | |
| 6,115,458 A | 9/2000 | Taskett | |
| 6,119,097 A | 9/2000 | Ibarra | |
| 6,119,103 A | 9/2000 | Basch et al. | |
| 6,119,107 A | 9/2000 | Polk | |
| 6,119,932 A | 9/2000 | Maloney et al. | |
| 6,122,623 A | 9/2000 | Garman | |
| 6,128,598 A | 10/2000 | Walker et al. | |
| 6,128,599 A | 10/2000 | Walker et al. | |
| 6,129,274 A | 10/2000 | Suzuki | |
| 6,129,572 A | 10/2000 | Feldman et al. | |
| 6,134,309 A | 10/2000 | Carson | |
| 6,134,536 A | 10/2000 | Shepherd | |
| 6,138,911 A | 10/2000 | Fredregill et al. | |
| 6,138,917 A | 10/2000 | Chapin, Jr. | |
| 6,141,666 A | 10/2000 | Tobin | |
| 6,142,640 A | 11/2000 | Schofield | |
| 6,144,848 A | 11/2000 | Walsh et al. | |
| 6,145,741 A | 11/2000 | Wisdom et al. | |
| 6,148,293 A | 11/2000 | King | |
| 6,148,297 A | 11/2000 | Swor et al. | |
| 6,154,731 A | 11/2000 | Monks et al. | |
| 6,161,096 A | 12/2000 | Bell | |
| 6,163,770 A | 12/2000 | Gamble et al. | |
| 6,163,771 A | 12/2000 | Walker et al. | |
| 6,164,533 A | 12/2000 | Barton | |
| 6,164,548 A | 12/2000 | Curiel | |
| 6,167,385 A | 12/2000 | Hartley-Urquhart | |
| 6,169,975 B1 | 1/2001 | White et al. | |
| 6,173,267 B1 | 1/2001 | Cairns | |
| 6,173,270 B1 | 1/2001 | Cristofich et al. | |
| 6,179,211 B1 | 1/2001 | Green et al. | |
| 6,182,048 B1 | 1/2001 | Osborn et al. | |
| 6,182,059 B1 | 1/2001 | Angotti et al. | |
| 6,182,894 B1 | 2/2001 | Hackett et al. | |
| 6,185,541 B1 | 2/2001 | Scroggie et al. | |
| 6,185,582 B1 | 2/2001 | Zellweger et al. | |
| 6,186,793 B1 | 2/2001 | Brubaker | |
| 6,188,309 B1 | 2/2001 | Levine | |
| 6,188,403 B1 | 2/2001 | Sacerdoti et al. | |
| 6,188,405 B1 | 2/2001 | Czerwinski et al. | |
| 6,188,993 B1 | 2/2001 | Eng et al. | |
| 6,189,787 B1 | 2/2001 | Dorf | |
| 6,192,113 B1 | 2/2001 | Lorsch | |
| 6,192,142 B1 | 2/2001 | Pare, Jr. et al. | |
| 6,195,092 B1 | 2/2001 | Dhond et al. | |
| 6,195,644 B1 | 2/2001 | Bowie | |
| 6,195,648 B1 | 2/2001 | Simon et al. | |
| 6,199,077 B1 | 3/2001 | Inala et al. | |
| 6,202,053 B1 | 3/2001 | Christiansen et al. | |
| 6,202,054 B1 | 3/2001 | Lawlor et al. | |
| 6,205,453 B1 | 3/2001 | Tucker et al. | |
| RE37,122 E | 4/2001 | Levine et al. | |
| 6,212,494 B1 | 4/2001 | Boguraev | |
| 6,213,392 B1 | 4/2001 | Zuppichich | |
| 6,222,557 B1 | 4/2001 | Pulley, IV et al. | |
| 6,222,914 B1 | 4/2001 | McMullin | |
| 6,223,143 B1 | 4/2001 | Weinstock et al. | |
| D442,627 S | 5/2001 | Webb et al. | |
| 6,227,445 B1 | 5/2001 | Brookner | |
| 6,227,447 B1 | 5/2001 | Campisano | |
| 6,227,972 B1 | 5/2001 | Walker et al. | |
| 6,236,978 B1 | 5/2001 | Tuzhilin | |
| 6,243,093 B1 | 6/2001 | Czerwinski et al. | |
| 6,243,688 B1 | 6/2001 | Kalina | |
| 6,249,775 B1 | 6/2001 | Freeman et al. | |
| 6,256,649 B1 | 7/2001 | Mackinlay et al. | |
| 6,260,758 B1 | 7/2001 | Blumberg | |
| 6,263,316 B1 | 7/2001 | Khan et al. | |
| 6,263,320 B1 | 7/2001 | Danilunas et al. | |
| 6,265,977 B1 | 7/2001 | Vega et al. | |
| 6,267,292 B1 | 7/2001 | Walker et al. | |
| 6,269,346 B1 | 7/2001 | Cristofich et al. | |
| 6,271,863 B1 | 8/2001 | Bose et al. | |
| 6,278,981 B1 | 8/2001 | Dembo et al. | |
| 6,278,996 B1 | 8/2001 | Richardson et al. | |
| 6,282,516 B1 | 8/2001 | Giullani | |
| 6,282,522 B1 | 8/2001 | Davis et al. | |
| 6,282,551 B1 | 8/2001 | Anderson et al. | |
| 6,289,322 B1 | 9/2001 | Kitchen et al. | |
| 6,292,786 B1 | 9/2001 | Deaton et al. | |
| 6,295,344 B1 | 9/2001 | Marshall | |
| 6,295,522 B1 | 9/2001 | Boesch | |
| D449,336 S | 10/2001 | Webb et al. | |
| 6,308,268 B1 | 10/2001 | Audebert | |
| 6,308,887 B1 | 10/2001 | Korman et al. | |
| 6,311,144 B1 | 10/2001 | Abu El Ata | |
| 6,315,193 B1 | 11/2001 | Hogan | |
| 6,315,195 B1 | 11/2001 | Ramachandran | |
| 6,317,726 B1 | 11/2001 | O'Shaughnessy | |
| 6,317,750 B1 | 11/2001 | Tortolani et al. | |
| 6,321,212 B1 | 11/2001 | Lange | |
| 6,324,524 B1 | 11/2001 | Lent et al. | |
| 6,324,526 B1 * | 11/2001 | D'Agostino | 705/44 |
| 6,327,573 B1 | 12/2001 | Walker et al. | |
| 6,327,575 B1 | 12/2001 | Katz | |
| 6,330,543 B1 | 12/2001 | Kepecs | |
| 6,330,546 B1 | 12/2001 | Gopinathan et al. | |
| 6,330,551 B1 | 12/2001 | Burchetta et al. | |
| 6,336,099 B1 | 1/2002 | Barnett et al. | |
| 6,338,048 B1 | 1/2002 | Mori | |
| 6,341,724 B2 | 1/2002 | Campisano | |
| 6,343,743 B1 | 2/2002 | Lamla | |
| 6,344,108 B1 | 2/2002 | Von Medvey et al. | |
| 6,345,261 B1 | 2/2002 | Feidelson | |
| 6,345,766 B1 | 2/2002 | Taskett et al. | |
| 6,349,290 B1 | 2/2002 | Horowitz et al. | |

(56) References Cited

U.S. PATENT DOCUMENTS

| | | |
|---|---|---|
| 6,349,291 B1 | 2/2002 | Varma |
| 6,349,972 B1 | 2/2002 | Geiger et al. |
| 6,351,735 B1 | 2/2002 | Deaton et al. |
| 6,360,188 B1 | 3/2002 | Freidman et al. |
| 6,360,954 B1 | 3/2002 | Barnardo |
| 6,363,393 B1 | 3/2002 | Ribitzky |
| 6,366,220 B1 | 4/2002 | Elliott |
| 6,366,967 B1 | 4/2002 | Wagner |
| 6,373,969 B1 | 4/2002 | Adler |
| 6,374,230 B1 | 4/2002 | Walker et al. |
| 6,377,669 B1 | 4/2002 | Walker et al. |
| 6,377,935 B1 | 4/2002 | Deaton et al. |
| 6,382,677 B1 | 5/2002 | Kaule et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,181 B2 | 6/2002 | Lent et al. |
| 6,405,182 B1 | 6/2002 | Cuervo |
| 6,405,204 B1 | 6/2002 | Baker et al. |
| 6,409,593 B1 | 6/2002 | Petrecca |
| 6,411,939 B1 | 6/2002 | Parsons |
| 6,411,947 B1 | 6/2002 | Rice et al. |
| 6,419,161 B1 | 7/2002 | Haddad |
| 6,422,459 B1 | 7/2002 | Kawan |
| 6,422,462 B1 | 7/2002 | Cohen |
| 6,424,029 B1 | 7/2002 | Giesler |
| 6,424,949 B1 | 7/2002 | Deaton et al. |
| 6,429,927 B1 | 8/2002 | Borza |
| 6,434,259 B1 | 8/2002 | Hamid et al. |
| D462,477 S | 9/2002 | Osborne |
| 6,446,210 B1 | 9/2002 | Borza |
| 6,450,407 B1 | 9/2002 | Freeman et al. |
| 6,452,613 B1 | 9/2002 | Lefebvre et al. |
| 6,454,647 B1 | 9/2002 | Woodbury, Jr. |
| 6,456,981 B1 | 9/2002 | Dejaeger et al. |
| 6,463,039 B1 | 10/2002 | Ricci et al. |
| 6,467,684 B2 | 10/2002 | Fite et al. |
| 6,471,128 B1 | 10/2002 | Corcoran et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,146 B2 | 11/2002 | Day et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,490,568 B1 | 12/2002 | Omara et al. |
| 6,490,569 B1 | 12/2002 | Grune et al. |
| 6,491,782 B1 | 12/2002 | Jaynes |
| 6,496,832 B2 | 12/2002 | Chi et al. |
| 6,498,861 B1 | 12/2002 | Hamid et al. |
| 6,502,080 B1 | 12/2002 | Eichorst et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,507,644 B1 | 1/2003 | Henderson et al. |
| 6,513,018 B1 | 1/2003 | Culhane |
| 6,513,019 B2 | 1/2003 | Lewis |
| 6,529,880 B1 | 3/2003 | McKeen et al. |
| 6,553,113 B1 | 4/2003 | Dhir et al. |
| 6,557,039 B1 | 4/2003 | Leong et al. |
| D474,235 S | 5/2003 | Haas |
| 6,557,750 B1 | 5/2003 | Druse et al. |
| 6,557,766 B1 | 5/2003 | Leighton |
| 6,558,255 B2 | 5/2003 | Walker et al. |
| 6,560,578 B2 | 5/2003 | Eldering |
| 6,560,581 B1 | 5/2003 | Fox et al. |
| 6,561,657 B1 | 5/2003 | Schofield |
| 6,567,786 B1 | 5/2003 | Bibelnieks et al. |
| 6,567,791 B2 | 5/2003 | Lent et al. |
| 6,567,821 B1 | 5/2003 | Polk |
| 6,574,603 B1 | 6/2003 | Dickson et al. |
| 6,575,361 B1 | 6/2003 | Graves et al. |
| 6,581,839 B1 | 6/2003 | Lasch et al. |
| 6,581,845 B2 | 6/2003 | Ye |
| D476,681 S | 7/2003 | Al Amri |
| D476,683 S | 7/2003 | Kilburn |
| D477,359 S | 7/2003 | Haas |
| 6,592,044 B1 | 7/2003 | Wong et al. |
| 6,594,640 B1 | 7/2003 | Postrel |
| 6,597,379 B1 | 7/2003 | Morris et al. |
| 6,601,040 B1 | 7/2003 | Kolls |
| 6,601,044 B1 | 7/2003 | Wallman |
| 6,601,761 B1 | 8/2003 | Katis |
| 6,607,127 B2 | 8/2003 | Wong |
| 6,609,111 B1 | 8/2003 | Bell |
| 6,609,113 B1 | 8/2003 | O'Leary et al. |
| 6,609,654 B1 | 8/2003 | Anderson et al. |
| 6,609,658 B1 | 8/2003 | Sehr |
| RE38,255 E | 9/2003 | Levine et al. |
| 6,615,189 B1 | 9/2003 | Phillips et al. |
| 6,615,190 B1 | 9/2003 | Slater |
| 6,624,752 B2 * | 9/2003 | Klitsgaard et al. ......... 340/572.1 |
| 6,625,582 B2 | 9/2003 | Richman et al. |
| D481,068 S | 10/2003 | Blossom et al. |
| 6,631,849 B2 | 10/2003 | Blossom |
| 6,641,049 B2 | 11/2003 | Luu |
| 6,641,050 B2 | 11/2003 | Kelley et al. |
| 6,644,551 B2 | 11/2003 | Clayman et al. |
| 6,647,374 B2 | 11/2003 | Kansal |
| 6,655,587 B2 | 12/2003 | Andrews et al. |
| 6,655,598 B1 | 12/2003 | Curiel |
| 6,659,259 B2 | 12/2003 | Knox et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,693,544 B1 | 2/2004 | Hebbecker |
| 6,705,518 B2 | 3/2004 | Park et al. |
| 6,715,797 B2 | 4/2004 | Curiel |
| 6,725,257 B1 | 4/2004 | Cansler et al. |
| 6,726,813 B2 | 4/2004 | Kaule et al. |
| 6,727,802 B2 | 4/2004 | Kelly et al. |
| 6,732,919 B2 | 5/2004 | Macklin et al. |
| 6,741,975 B1 | 5/2004 | Nakisa et al. |
| 6,742,125 B1 | 5/2004 | Gabber et al. |
| D490,840 S | 6/2004 | Arakaki et al. |
| D491,186 S | 6/2004 | Arakaki et al. |
| D491,953 S | 6/2004 | Arakaki et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| D493,195 S | 7/2004 | Creighton |
| 6,764,014 B2 | 7/2004 | Lasch et al. |
| 6,785,661 B1 | 8/2004 | Mandler et al. |
| D495,736 S | 9/2004 | Scharf |
| D496,365 S | 9/2004 | Liu et al. |
| 6,793,131 B2 | 9/2004 | Hogan |
| 6,793,135 B1 | 9/2004 | Ryoo |
| 6,802,008 B1 | 10/2004 | Ikefuji et al. |
| 6,805,287 B2 | 10/2004 | Bishop |
| 6,805,288 B2 | 10/2004 | Routhenstein et al. |
| 6,805,289 B2 | 10/2004 | Noriega et al. |
| D498,236 S | 11/2004 | Liu et al. |
| 6,814,282 B2 | 11/2004 | Seifert et al. |
| 6,820,061 B2 | 11/2004 | Postrel |
| 6,829,586 B2 | 12/2004 | Postrel |
| 6,834,796 B2 | 12/2004 | Anvekar et al. |
| 6,842,739 B2 | 1/2005 | Postrel |
| 6,845,906 B2 | 1/2005 | Royer et al. |
| 6,850,923 B1 | 2/2005 | Nakisa et al. |
| 6,856,973 B1 | 2/2005 | Bott |
| 6,865,547 B1 | 3/2005 | Brake, Jr. et al. |
| 6,868,426 B1 | 3/2005 | Mankoff |
| 6,876,971 B1 | 4/2005 | Burke |
| 6,880,084 B1 | 4/2005 | Brittenham et al. |
| 6,885,994 B1 | 4/2005 | Scroggie et al. |
| 6,886,046 B2 | 4/2005 | Stutz et al. |
| D505,450 S | 5/2005 | Lauer et al. |

(56) References Cited

U.S. PATENT DOCUMENTS

| | | |
|---|---|---|
| 6,886,741 B1 | 5/2005 | Salveson |
| 6,892,052 B2 * | 5/2005 | Kotola et al. ............... 455/41.2 |
| 6,892,187 B2 | 5/2005 | Phillips et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,913,193 B1 | 7/2005 | Kawan |
| 6,924,026 B2 | 8/2005 | Jaynes |
| 6,931,382 B2 | 8/2005 | Laage et al. |
| 6,942,156 B2 | 9/2005 | Ohta et al. |
| 6,942,569 B2 | 9/2005 | Petrecca |
| 6,945,453 B1 | 9/2005 | Schwarz Jr. |
| 6,947,898 B2 | 9/2005 | Postrel |
| 6,954,741 B1 | 10/2005 | Burchetta et al. |
| 6,961,710 B1 | 11/2005 | Yanagisawa et al. |
| 6,970,830 B1 | 11/2005 | Samra et al. |
| 6,978,369 B2 | 12/2005 | Wheeler et al. |
| 6,985,880 B1 | 1/2006 | Hodgdon et al. |
| 6,999,569 B2 | 2/2006 | Risafi et al. |
| 6,999,938 B1 | 2/2006 | Libman |
| 6,999,943 B1 | 2/2006 | Johnson et al. |
| 7,006,992 B1 | 2/2006 | Packwood |
| 7,014,110 B2 | 3/2006 | Minowa et al. |
| 7,024,374 B1 | 4/2006 | Day et al. |
| 7,025,256 B1 | 4/2006 | Drummond et al. |
| 7,031,939 B1 | 4/2006 | Gallagher et al. |
| 7,039,600 B1 | 5/2006 | Meek et al. |
| 7,047,222 B1 | 5/2006 | Bush |
| 7,050,996 B1 | 5/2006 | Blagg et al. |
| 7,051,001 B1 | 5/2006 | Slater |
| 7,051,925 B2 | 5/2006 | Schwarz, Jr. |
| 7,051,929 B2 | 5/2006 | Li |
| 7,054,842 B2 | 5/2006 | James et al. |
| 7,063,924 B2 | 6/2006 | Kaminsky et al. |
| 7,070,095 B1 | 7/2006 | Gandel et al. |
| 7,072,864 B2 | 7/2006 | Brake, Jr. et al. |
| 7,072,909 B2 | 7/2006 | Polk |
| 7,076,465 B1 | 7/2006 | Blagg et al. |
| 7,082,416 B2 | 7/2006 | Anderson |
| 7,083,084 B2 | 8/2006 | Graves et al. |
| 7,089,202 B1 | 8/2006 | McNamar et al. |
| 7,089,503 B1 | 8/2006 | Bloomquist et al. |
| 7,092,905 B2 | 8/2006 | Behrenbrinker et al. |
| 7,092,916 B2 | 8/2006 | Diveley et al. |
| 7,104,443 B1 | 9/2006 | Paul et al. |
| 7,107,249 B2 | 9/2006 | Dively et al. |
| 7,113,914 B1 | 9/2006 | Spielmann et al. |
| D530,741 S | 10/2006 | Blossom |
| 7,120,601 B2 | 10/2006 | Chen et al. |
| 7,128,272 B2 | 10/2006 | Doublet |
| D533,220 S | 12/2006 | Graves et al. |
| 7,156,301 B1 | 1/2007 | Bonalle et al. |
| 7,163,153 B2 | 1/2007 | Blossom |
| 7,165,049 B2 | 1/2007 | Slater |
| 7,167,844 B1 | 1/2007 | Leong et al. |
| 7,181,427 B1 | 2/2007 | DeFrancesco et al. |
| 7,184,973 B2 | 2/2007 | Monteleone et al. |
| D538,349 S | 3/2007 | Hollands |
| 7,191,952 B2 | 3/2007 | Blossom |
| 7,195,154 B2 | 3/2007 | Routhenstein |
| 7,216,091 B1 | 5/2007 | Blandina et al. |
| 7,216,099 B2 | 5/2007 | Chen et al. |
| 7,225,155 B1 | 5/2007 | Polk |
| 7,228,155 B2 | 6/2007 | Saunders |
| 7,239,226 B2 | 7/2007 | Berardi et al. |
| 7,243,839 B2 | 7/2007 | Beck et al. |
| 7,249,092 B2 | 7/2007 | Dunn et al. |
| 7,249,112 B2 | 7/2007 | Berardi et al. |
| 7,252,223 B2 | 8/2007 | Schofield |
| 7,252,226 B2 | 8/2007 | Risafi et al. |
| 7,254,560 B2 | 8/2007 | Singhal |
| D551,705 S | 9/2007 | Mershon |
| 7,266,524 B1 | 9/2007 | Butcher, III |
| 7,275,160 B2 | 9/2007 | Pearson et al. |
| 7,295,999 B1 | 11/2007 | Simon et al. |
| 7,306,141 B1 | 12/2007 | Schwarz, Jr. |
| 7,306,163 B2 | 12/2007 | Scholz et al. |
| 7,310,617 B1 | 12/2007 | Cunningham |
| 7,311,244 B1 | 12/2007 | Schwarz, Jr. |
| 7,312,707 B1 | 12/2007 | Bishop et al. |
| 7,315,843 B2 | 1/2008 | Diveley et al. |
| D562,888 S | 2/2008 | Brown |
| 7,346,567 B2 | 3/2008 | Weeks |
| 7,349,866 B2 | 3/2008 | Schwarz, Jr. |
| 7,357,331 B2 | 4/2008 | Blossom |
| 7,359,880 B2 | 4/2008 | Abel et al. |
| 7,392,221 B2 | 6/2008 | Nabe |
| 7,392,222 B1 | 6/2008 | Hamilton et al. |
| 7,392,224 B1 | 6/2008 | Bauer et al. |
| 7,398,241 B2 | 7/2008 | Fay et al. |
| 7,398,248 B2 | 7/2008 | Phillips et al. |
| 7,401,049 B2 | 7/2008 | Hobbs et al. |
| 7,409,364 B1 | 8/2008 | Barton et al. |
| D576,671 S | 9/2008 | Field et al. |
| D582,476 S | 12/2008 | Field et al. |
| D582,977 S | 12/2008 | Field et al. |
| 7,461,028 B2 | 12/2008 | Wronski, Jr. |
| 7,479,320 B2 | 1/2009 | Keller et al. |
| 7,493,288 B2 | 2/2009 | Biship et al. |
| 7,494,057 B2 | 2/2009 | Lasch et al. |
| 7,502,758 B2 | 3/2009 | Burke |
| 7,503,503 B2 | 3/2009 | Riedl et al. |
| 7,506,806 B2 | 3/2009 | Bonalle et al. |
| 7,530,491 B2 | 5/2009 | Lasch et al. |
| 7,588,184 B2 | 9/2009 | Gandel et al. |
| 7,591,416 B2 | 9/2009 | Blossom |
| D602,522 S | 10/2009 | Field et al. |
| D602,986 S | 10/2009 | Skelding et al. |
| 7,606,730 B2 | 10/2009 | Antonucci |
| 7,660,763 B1 | 2/2010 | Brake, Jr. et al. |
| 7,676,425 B1 | 3/2010 | Noles |
| 7,707,111 B2 | 4/2010 | Brake, Jr. et al. |
| 2001/0001856 A1 | 5/2001 | Gould et al. |
| 2001/0002487 A1 | 5/2001 | Grawrock et al. |
| 2001/0011227 A1 | 8/2001 | Ashery et al. |
| 2001/0011243 A1 | 8/2001 | Dembo et al. |
| 2001/0014868 A1 | 8/2001 | Herz et al. |
| 2001/0027389 A1 | 10/2001 | Beverina et al. |
| 2001/0027437 A1 | 10/2001 | Turbeville et al. |
| 2001/0027441 A1 | 10/2001 | Wankmueller |
| 2001/0032312 A1 | 10/2001 | Runje et al. |
| 2001/0034647 A1 | 10/2001 | Marks et al. |
| 2001/0034663 A1 | 10/2001 | Teveler et al. |
| 2001/0034682 A1 | 10/2001 | Knight et al. |
| 2001/0034684 A1 | 10/2001 | Cushing et al. |
| 2001/0037276 A1 | 11/2001 | Kelly et al. |
| 2001/0037315 A1 | 11/2001 | Saliba et al. |
| 2001/0038033 A1 | 11/2001 | Habib |
| 2001/0044293 A1 | 11/2001 | Morgan |
| 2001/0044733 A1 | 11/2001 | Lee et al. |
| 2001/0047332 A1 | 11/2001 | Gonen-Friedman et al. |
| 2001/0047342 A1 | 11/2001 | Cuervo |
| 2001/0051917 A1 | 12/2001 | Bissonette et al. |
| 2001/0054003 A1 | 12/2001 | Chien et al. |
| 2001/0056398 A1 | 12/2001 | Scheirer |
| 2002/0007313 A1 | 1/2002 | Mai et al. |
| 2002/0007330 A1 | 1/2002 | Kumar et al. |
| 2002/0010591 A1 | 1/2002 | Pomerance |
| 2002/0013751 A1 | 1/2002 | Facciani et al. |
| 2002/0019791 A1 | 2/2002 | Goss et al. |
| 2002/0019793 A1 | 2/2002 | Frattalone |
| 2002/0019802 A1 | 2/2002 | Malme et al. |
| 2002/0019803 A1 | 2/2002 | Muller |
| 2002/0023032 A1 * | 2/2002 | Pearson et al. .................. 705/35 |
| 2002/0026416 A1 | 2/2002 | Provinse |
| 2002/0026418 A1 | 2/2002 | Koppel et al. |
| 2002/0032609 A1 | 3/2002 | Wilkman |
| 2002/0035527 A1 | 3/2002 | Corrin |
| 2002/0046089 A1 | 4/2002 | Zorn |
| 2002/0046255 A1 | 4/2002 | Moore et al. |
| 2002/0059139 A1 | 5/2002 | Evans |
| 2002/0062235 A1 | 5/2002 | Wahlbin et al. |
| 2002/0062249 A1 | 5/2002 | Iannacci |

(56) References Cited

U.S. PATENT DOCUMENTS

| | | |
|---|---|---|
| 2002/0062279 A1 | 5/2002 | Behrenbrinker et al. |
| 2002/0065712 A1 | 5/2002 | Kawan et al. |
| 2002/0065720 A1 | 5/2002 | Carswell et al. |
| 2002/0067373 A1 | 6/2002 | Roe et al. |
| 2002/0069122 A1 | 6/2002 | Yun et al. |
| 2002/0073005 A1 | 6/2002 | Welnicki et al. |
| 2002/0073030 A1 | 6/2002 | Offer |
| 2002/0077964 A1 | 6/2002 | Brody et al. |
| 2002/0077978 A1 | 6/2002 | O'Leary et al. |
| 2002/0078086 A1 | 6/2002 | Alden et al. |
| 2002/0082990 A1 | 6/2002 | Jones |
| 2002/0091572 A1 | 7/2002 | Anderson et al. |
| 2002/0091631 A1 | 7/2002 | Usui |
| 2002/0091632 A1 | 7/2002 | Turock et al. |
| 2002/0091649 A1 | 7/2002 | Anvekar et al. |
| 2002/0095365 A1 | 7/2002 | Slavin et al. |
| 2002/0099586 A1 | 7/2002 | Bladen et al. |
| 2002/0099667 A1 | 7/2002 | Diamandis et al. |
| 2002/0103852 A1 | 8/2002 | Pushka |
| 2002/0104878 A1 | 8/2002 | Seifert et al. |
| 2002/0111850 A1 | 8/2002 | Smrcka et al. |
| 2002/0111886 A1 | 8/2002 | Chenevich et al. |
| 2002/0111890 A1 | 8/2002 | Sloan et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0117541 A1 | 8/2002 | Biggar et al. |
| 2002/0120627 A1 | 8/2002 | Mankoff |
| 2002/0120642 A1 | 8/2002 | Fetherston |
| 2002/0129221 A1 | 9/2002 | Borgin et al. |
| 2002/0133383 A1 | 9/2002 | Chao et al. |
| 2002/0133461 A1 | 9/2002 | Ramachandran |
| 2002/0138418 A1 | 9/2002 | Zarin et al. |
| 2002/0143703 A1 | 10/2002 | Razvan et al. |
| 2002/0145039 A1 | 10/2002 | Carroll |
| 2002/0147662 A1 | 10/2002 | Anderson |
| 2002/0147668 A1 | 10/2002 | Smith et al. |
| 2002/0147683 A1 | 10/2002 | Capobianco et al. |
| 2002/0152168 A1 | 10/2002 | Neofytides et al. |
| 2002/0156723 A1 | 10/2002 | Lilly et al. |
| 2002/0161699 A1 | 10/2002 | Okamoto et al. |
| 2002/0161702 A1 | 10/2002 | Milberger et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0174030 A1 | 11/2002 | Praisner et al. |
| 2002/0178025 A1 | 11/2002 | Hansen et al. |
| 2002/0178063 A1 | 11/2002 | Gravelle et al. |
| 2002/0190123 A1 | 12/2002 | Anvekar et al. |
| 2002/0194081 A1 | 12/2002 | Perkowski |
| 2002/0194098 A1 | 12/2002 | Stiff et al. |
| 2002/0198797 A1 | 12/2002 | Cooper et al. |
| 2002/0198848 A1 | 12/2002 | Michener |
| 2003/0004828 A1 | 1/2003 | Epstein |
| 2003/0010831 A1 | 1/2003 | Ye |
| 2003/0018492 A1 | 1/2003 | Carlson |
| 2003/0018613 A1 | 1/2003 | Oytac |
| 2003/0023549 A1 | 1/2003 | Armes et al. |
| 2003/0028466 A1 | 2/2003 | Jenson et al. |
| 2003/0028483 A1 | 2/2003 | Sanders et al. |
| 2003/0028518 A1 | 2/2003 | Mankoff |
| 2003/0031321 A1 | 2/2003 | Mages |
| 2003/0033211 A1 | 2/2003 | Haines et al. |
| 2003/0033246 A1 | 2/2003 | Slater |
| 2003/0034388 A1 | 2/2003 | Routhenstein et al. |
| 2003/0040927 A1 | 2/2003 | Sato et al. |
| 2003/0040959 A1 | 2/2003 | Fei et al. |
| 2003/0046249 A1 | 3/2003 | Wu |
| 2003/0046542 A1* | 3/2003 | Chen et al. .................. 713/176 |
| 2003/0053609 A1 | 3/2003 | Risafi et al. |
| 2003/0055780 A1 | 3/2003 | Hansen et al. |
| 2003/0055782 A1 | 3/2003 | Slater |
| 2003/0061132 A1 | 3/2003 | Yu, Sr. et al. |
| 2003/0061137 A1 | 3/2003 | Leung et al. |
| 2003/0061157 A1 | 3/2003 | Hirka et al. |
| 2003/0061168 A1 | 3/2003 | Routhenstein |
| 2003/0065624 A1 | 4/2003 | James et al. |
| 2003/0074167 A1 | 4/2003 | Browne et al. |
| 2003/0074290 A1 | 4/2003 | Clore |
| 2003/0078815 A1 | 4/2003 | Parsons |
| 2003/0085272 A1 | 5/2003 | Andrews et al. |
| 2003/0085286 A1 | 5/2003 | Kelley et al. |
| 2003/0093351 A1 | 5/2003 | Sarabanchong |
| 2003/0101119 A1 | 5/2003 | Parsons et al. |
| 2003/0105672 A1 | 6/2003 | Epstein et al. |
| 2003/0105714 A1 | 6/2003 | Alarcon Luther et al. |
| 2003/0110111 A1 | 6/2003 | Nalebuff et al. |
| 2003/0120571 A1 | 6/2003 | Blagg |
| 2003/0126017 A1 | 7/2003 | Rau et al. |
| 2003/0130940 A1 | 7/2003 | Hansen et al. |
| 2003/0130948 A1 | 7/2003 | Algiene et al. |
| 2003/0135453 A1 | 7/2003 | Caulfield et al. |
| 2003/0135459 A1 | 7/2003 | Abelman et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0149660 A1 | 8/2003 | Canfield |
| 2003/0154125 A1 | 8/2003 | Mittal et al. |
| 2003/0154163 A1 | 8/2003 | Phillips et al. |
| 2003/0163403 A1 | 8/2003 | Chen et al. |
| 2003/0163416 A1 | 8/2003 | Kitajima |
| 2003/0167218 A1 | 9/2003 | Field et al. |
| 2003/0167220 A1 | 9/2003 | Schoen et al. |
| 2003/0172040 A1 | 9/2003 | Kemper et al. |
| 2003/0182218 A1 | 9/2003 | Blagg |
| 2003/0182246 A1 | 9/2003 | Johnson et al. |
| 2003/0195808 A1 | 10/2003 | Brown et al. |
| 2003/0195842 A1 | 10/2003 | Reece |
| 2003/0200143 A9 | 10/2003 | Walker et al. |
| 2003/0200179 A1 | 10/2003 | Kwan |
| 2003/0200180 A1 | 10/2003 | Phelan et al. |
| 2003/0204421 A1 | 10/2003 | Houle et al. |
| 2003/0205616 A1 | 11/2003 | Graves |
| 2003/0212628 A1 | 11/2003 | Kuttan et al. |
| 2003/0213843 A1 | 11/2003 | Jackson |
| 2003/0216965 A1 | 11/2003 | Libman |
| 2003/0217005 A1 | 11/2003 | Drummond et al. |
| 2003/0217329 A1 | 11/2003 | Good |
| 2003/0218062 A1 | 11/2003 | Noriega et al. |
| 2003/0218066 A1 | 11/2003 | Fernandes et al. |
| 2003/0222136 A1 | 12/2003 | Bolle et al. |
| 2003/0229525 A1 | 12/2003 | Callahan et al. |
| 2003/0229582 A1 | 12/2003 | Sherman et al. |
| 2004/0024672 A1 | 2/2004 | Brake, Jr. et al. |
| 2004/0024693 A1 | 2/2004 | Lawrence |
| 2004/0029569 A1 | 2/2004 | Khan et al. |
| 2004/0030626 A1 | 2/2004 | Libman |
| 2004/0039588 A1 | 2/2004 | Libman |
| 2004/0049451 A1* | 3/2004 | Berardi et al. .................. 705/39 |
| 2004/0049452 A1 | 3/2004 | Blagg |
| 2004/0054610 A1 | 3/2004 | Amstutz et al. |
| 2004/0054622 A1 | 3/2004 | Strayer et al. |
| 2004/0059952 A1 | 3/2004 | Newport et al. |
| 2004/0064332 A1 | 4/2004 | Zou et al. |
| 2004/0064402 A1 | 4/2004 | Dreyer et al. |
| 2004/0078328 A1 | 4/2004 | Talbert et al. |
| 2004/0088236 A1 | 5/2004 | Manning |
| 2004/0088238 A1 | 5/2004 | Gilson et al. |
| 2004/0093296 A1 | 5/2004 | Phelan et al. |
| 2004/0093303 A1 | 5/2004 | Picciallo |
| 2004/0094624 A1 | 5/2004 | Fernandes et al. |
| 2004/0098351 A1 | 5/2004 | Duke |
| 2004/0103431 A1 | 5/2004 | Davenport et al. |
| 2004/0117202 A1 | 6/2004 | Winklevoss et al. |
| 2004/0117300 A1 | 6/2004 | Jones et al. |
| 2004/0118914 A1 | 6/2004 | Smith et al. |
| 2004/0122736 A1 | 6/2004 | Strock et al. |
| 2004/0128186 A1 | 7/2004 | Breslin et al. |
| 2004/0128195 A1 | 7/2004 | Sorem |
| 2004/0128217 A1 | 7/2004 | Friedman et al. |
| 2004/0133787 A1 | 7/2004 | Doughty et al. |
| 2004/0149544 A1 | 8/2004 | Dal Ferro |

(56) References Cited

U.S. PATENT DOCUMENTS

| | | |
|---|---|---|
| 2004/0155101 A1 | 8/2004 | Royer et al. |
| 2004/0158517 A1 | 8/2004 | Mahaney et al. |
| 2004/0159700 A1 | 8/2004 | Khan et al. |
| 2004/0172350 A1 | 9/2004 | Atkinson et al. |
| 2004/0186773 A1 | 9/2004 | George et al. |
| 2004/0193539 A1 | 9/2004 | Sullivan |
| 2004/0210498 A1 | 10/2004 | Freund |
| 2004/0215507 A1 | 10/2004 | Levitt et al. |
| 2004/0232223 A1 | 11/2004 | Beenau et al. |
| 2004/0236641 A1 | 11/2004 | Abbott et al. |
| 2004/0236688 A1 | 11/2004 | Bozeman |
| 2004/0239481 A1 | 12/2004 | Beenau |
| 2004/0242308 A1 | 12/2004 | Gray |
| 2004/0243498 A1 | 12/2004 | Duke |
| 2004/0252012 A1 | 12/2004 | Beenau et al. |
| 2004/0267651 A1 | 12/2004 | Jenson et al. |
| 2005/0004855 A1 | 1/2005 | Jenson et al. |
| 2005/0004856 A1 | 1/2005 | Brose et al. |
| 2005/0010510 A1 | 1/2005 | Brose et al. |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027632 A1 | 2/2005 | Zeitoun et al. |
| 2005/0027649 A1 | 2/2005 | Cech |
| 2005/0033619 A1 | 2/2005 | Barnes et al. |
| 2005/0035192 A1 | 2/2005 | Bonalle et al. |
| 2005/0035847 A1 | 2/2005 | Bonalle et al. |
| 2005/0040242 A1 | 2/2005 | Beenau et al. |
| 2005/0049950 A1 | 3/2005 | Johnson |
| 2005/0060252 A1 | 3/2005 | Doddington |
| 2005/0060260 A1 | 3/2005 | Masuda et al. |
| 2005/0065877 A1 | 3/2005 | Cleary et al. |
| 2005/0071230 A1 | 3/2005 | Mankoff |
| 2005/0075932 A1 | 4/2005 | Mankoff |
| 2005/0077349 A1 | 4/2005 | Bonalle et al. |
| 2005/0077350 A1 | 4/2005 | Courtion et al. |
| 2005/0086160 A1 | 4/2005 | Wong et al. |
| 2005/0091138 A1 | 4/2005 | Awatsu |
| 2005/0091492 A1 | 4/2005 | Benson et al. |
| 2005/0102228 A1 | 5/2005 | Srinivasan et al. |
| 2005/0108152 A1 | 5/2005 | Tsoa-Lee et al. |
| 2005/0114883 A1 | 5/2005 | Nagai et al. |
| 2005/0116024 A1 | 6/2005 | Beenau et al. |
| 2005/0119979 A1 | 6/2005 | Murashita et al. |
| 2005/0144108 A1 | 6/2005 | Loeper |
| 2005/0165695 A1* | 7/2005 | Berardi et al. ............. 705/64 |
| 2005/0167488 A1 | 8/2005 | Higgins et al. |
| 2005/0171842 A1 | 8/2005 | Tien et al. |
| 2005/0171898 A1 | 8/2005 | Bishop et al. |
| 2005/0179251 A1 | 8/2005 | Wagoner et al. |
| 2005/0189427 A1 | 9/2005 | Brown et al. |
| 2005/0199705 A1 | 9/2005 | Beck et al. |
| 2005/0206499 A1 | 9/2005 | Fisher |
| 2005/0216888 A1 | 9/2005 | Drummond et al. |
| 2005/0234771 A1 | 10/2005 | Register et al. |
| 2005/0269396 A1 | 12/2005 | Schofield |
| 2005/0289044 A1 | 12/2005 | Breslin et al. |
| 2006/0020542 A1 | 1/2006 | Little |
| 2006/0026092 A1 | 2/2006 | Klein et al. |
| 2006/0036543 A1 | 2/2006 | Blagg et al. |
| 2006/0036553 A1 | 2/2006 | Gupta et al. |
| 2006/0039733 A1 | 2/2006 | Meyerhofer |
| 2006/0041540 A1 | 2/2006 | Shannon |
| 2006/0047573 A1 | 3/2006 | Mitchell et al. |
| 2006/0047589 A1 | 3/2006 | Grau |
| 2006/0074794 A1 | 4/2006 | Nespola, Jr. |
| 2006/0085334 A1 | 4/2006 | Murphy |
| 2006/0106696 A1 | 5/2006 | Carlson |
| 2006/0116903 A1 | 6/2006 | Becerra |
| 2006/0116995 A1 | 6/2006 | Strayer et al. |
| 2006/0122918 A1 | 6/2006 | Graboske et al. |
| 2006/0131869 A1 | 6/2006 | Brignull |
| 2006/0157557 A1 | 7/2006 | Lee et al. |
| 2006/0178937 A1 | 8/2006 | Rau et al. |
| 2006/0224480 A1 | 10/2006 | Bent et al. |
| 2006/0242057 A1 | 10/2006 | Velarde |
| 2006/0249574 A1 | 11/2006 | Brown et al. |
| 2006/0251478 A1 | 11/2006 | Desmeules |
| 2006/0259364 A1 | 11/2006 | Strock et al. |
| 2006/0261927 A1 | 11/2006 | Kelly et al. |
| 2006/0289636 A1 | 12/2006 | Hoblit |
| 2007/0020443 A1 | 1/2007 | Lo |
| 2007/0034700 A1 | 2/2007 | Poidomani et al. |
| 2007/0063025 A1 | 3/2007 | Blossom |
| 2007/0078719 A1 | 4/2007 | Schmitt et al. |
| 2007/0094084 A1 | 4/2007 | Rau et al. |
| 2007/0094154 A1 | 4/2007 | Rau et al. |
| 2007/0136211 A1 | 6/2007 | Brown et al. |
| 2007/0156530 A1 | 7/2007 | Schmitt et al. |
| 2007/0203825 A1 | 8/2007 | Hanifin et al. |
| 2007/0208671 A1 | 9/2007 | Brown et al. |
| 2007/0215688 A1 | 9/2007 | Routhenstein |
| 2007/0228144 A1 | 10/2007 | Knackstedt et al. |
| 2007/0265924 A1 | 11/2007 | Schwarz |
| 2008/0005018 A1 | 1/2008 | Powell |
| 2008/0010202 A1 | 1/2008 | Schwarz |
| 2008/0021841 A1 | 1/2008 | Rau et al. |
| 2008/0027841 A1 | 1/2008 | Eder |
| 2008/0177659 A1 | 7/2008 | Lacey et al. |
| 2008/0187770 A1 | 8/2008 | Funicelli et al. |
| 2008/0230600 A1 | 9/2008 | Black et al. |
| 2008/0245865 A1 | 10/2008 | Mosteller |
| 2008/0301041 A1 | 12/2008 | Bruk |
| 2009/0043651 A1 | 2/2009 | Schwarz |
| 2009/0048972 A1 | 2/2009 | Bierer et al. |
| 2009/0150370 A1 | 6/2009 | Christensen et al. |
| 2009/0192906 A1 | 7/2009 | Rau et al. |
| 2009/0230195 A1 | 9/2009 | Lasch et al. |
| 2009/0240620 A1 | 9/2009 | Kendrick et al. |
| 2009/0242645 A1 | 10/2009 | Komatsu et al. |
| 2009/0250522 A1 | 10/2009 | Williams et al. |
| 2009/0261161 A1 | 10/2009 | Blossom |
| 2009/0265275 A1 | 10/2009 | Everhart |
| 2009/0271853 A1 | 10/2009 | Everhart |
| 2010/0030675 A1 | 2/2010 | Hanan et al. |
| 2010/0030697 A1 | 2/2010 | Goodrich et al. |

FOREIGN PATENT DOCUMENTS

| | | |
|---|---|---|
| EP | 0843292 A2 | 5/1998 |
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| JP | 64-87397 | 3/1989 |
| JP | 3-114879 | 5/1991 |
| JP | 4-073193 | 3/1992 |
| JP | 4-201392 | 7/1992 |
| JP | 5-011676 | 1/1993 |
| JP | 8-080680 | 3/1996 |
| JP | 8-096098 | 4/1996 |
| JP | 10-116016 | 5/1998 |
| JP | 2000-113151 | 4/2000 |
| JP | 2002-163589 | 6/2002 |
| JP | 2002-259933 | 9/2002 |
| JP | 2002-366015 | 12/2002 |
| JP | 2005-246658 | 9/2005 |
| JP | 2008-015071 | 1/2008 |
| WO | WO 94/29112 | 12/1994 |
| WO | WO 97-20692 | 6/1997 |
| WO | WO 97/41673 | 11/1997 |
| WO | WO 9810368 | 3/1998 |
| WO | WO 98/59307 | 12/1998 |
| WO | WO 99/05633 | 2/1999 |
| WO | WO 99/27479 | 6/1999 |
| WO | WO 99-54841 | 10/1999 |
| WO | WO 00/02256 | 1/2000 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 0188659 | 11/2001 |

(56) References Cited

FOREIGN PATENT DOCUMENTS

| | | |
|---|---|---|
| WO | WO 02/069212 | 9/2002 |
| WO | WO 2005-043277 | 5/2005 |
| WO | WO 2005-101975 | 11/2005 |
| WO | WO 2006-060370 | 6/2006 |
| WO | WO 2006-105092 | 10/2006 |
| WO | WO 2006-116772 | 11/2006 |
| WO | WO 2007-115725 | 10/2007 |
| WO | WO 2008-021381 | 2/2008 |
| WO | WO 2008-021382 | 2/2008 |
| WO | WO 2009-023817 | 2/2009 |

OTHER PUBLICATIONS

International Search Report for PCT/US03/09500, filing date Mar. 31, 2003, pp. 1-3.
Roger et al., A Credit Scoring Model to Evaluate the Credit Worthiness of Credit Card Applicants, Developments in Marketing Science, vol. 5, 1982.
Pourmokhtar, A Hedge Fund Primer Version 0.1, www.emf.net/?farzin/hedgefund.html, printed Jul. 24, 2002, 5 pages.
At Your Request, www.wingspanbank.com, Sep. 28, 1999.
CSU/DSU (Channel Service Unit/Data Service Unit), CTI (Computer-Telephony Integration), pp. 208-210.
Markese, Can You Trust Mutual Fund Rankings?, Consumers' Research Magazine, vol. 76, No. 10, Research Library, Oct. 1993, p. 20.
Taylor et al., Card Issuers Turn to Scoring as They Face Increasing Risk, Financial Services Report, vol. 8, No. 15, Jul. 24, 1991, p. 1.
Quinn, Credit Card Issuers Keeping a Closer Watch on How You Pay Bills, Washington Post, Staying Ahead, Business Section P6, Apr. 25, 1988, 1 page.
Friedland, Credit Scoring Digs Deeper into Data, Credit World, vol. 84, No. 5, May 1996, pp. 19-23.
Credit Scoring New Markets, Bank Technology News, vol. 9, No. 7, Jul. 1996, p. 1.
Derivatives Primer, CEIBA, Association for Financial Professionals, Committee on Investment of Employee Benefit Assets, Dec. 2001.
Cumby et al., Evaluating the Performance of International Mutual Funds, The Journal of Finance, vol. 45, No. 2, Jun. 1990, pp. 497-521.
Jameson, Expanding Risk Management Strategies: Key to Future Survival, Credit World, vol. 84, No. 5, May 1996, pp. 16-18.
FreeMarkets, printed on Apr. 26, 1999.
Armstrong, Fund of Funds: Perfect Solution or Dangerous Shortcut?, Investor Solutions, Inc., www.investorsolutions.com, printed Jul. 24, 2002.
GS-Calc 6.0.1.1.; JPS Development; http://download.com, printed Sep. 3, 2003.
Gottfried et al., Graphical definitions: making spreadsheets visual through direct manipulation and gestures, Visual Languages, 1997, Proceedings, 1997 IEEE Symposium on, Sep. 23-26, 1997, pp. 246-253, Abstract.
Hedge Fund Primer—The Basics, KSP Capital Management LLC, information@kspcapital.com, printed Jul. 24, 2002, 18 pages.
Hedge Fund Primer About Fund of Funds, Links Securities LLC, www.hedgefund.net/prime_fof.php3, 2002, 2 pages.
Kneis, Hedge Fund Strategies: A Primer, Canadianhedgewatch, p. 3.
Buchner et al., HotDoc: a flexible framework for spatial composition, Visual Languages, 1997, Proceedings, 1997 IEEE Symposim, Abstract, Sep. 23-26, 1997, pp. 92-99.
Asch, How the RMA/Fair Isaac credit-scoring model was built, Journal of Commercial Lending, vol. 77, No. 10, Jun. 1995, pp. 10-16.
Huddling With William Bernstein: Small Town Doctor, Investing Pro.
Snyder et al., Identifying design requirements using analysis structures, Aerospace and Electronics Conference, 1991, NAECON, 1991, vol. 2, Abstract, May 20-24, 1991, pp. 786-792.
Meredith, Internet bank moves closer to virtual reality, USA Today, May 5, 1995.
Internet, Lending Tree, Mortgage Apply Online in Minutes, www.lendingtree.com, 7 pages, printed Feb. 1, 1999.
Makuch, Managing Consumer Credit Delinquency in the US Economy: A Multi-Billion Dollar Management Science Application, Interfaces, Feb. 1992, pp. 90-109.
Bogle, Mutual Funds at the Millennium: Fund Directors and Fund Myths, The Vanguard Group to the '40 Act Institute of PLI (Practicing Law Institute), New York, NY, May 15, 2000, 15 pages.
Davenport et al., Numbers—a medium that counts [spreadsheet software]; Computer Graphics and Applications; IEEE; vol. 11; Issue 4; Abstract, Jul. 1991, pp. 39-44.
Opportunity Knocks at Scoring's Door, Collection and Credit Risk, vol. 2, No. 4, Apr. 1997, p. 53.
Stolte et al., Polaris: a system for query, analysis, and visualization of multidimensional relational databases; Visualization and Computer Graphics; IEEE Transactions on; vol. 8; Issue 1; Abstract, Jan./Mar. 2002, pp. 52-65.
Primer: Derivatives Instruments, Derivatives Study Center, www.econstrat.org/dscinstruments.htm, printed Jul. 24, 2002, 8 pages.
Chi et al., Principles for information visualization spreadsheets; Computer Graphics and Applications; IEEE; vol. 18; Issue 4; Abstract, Jul./Aug. 1998, pp. 92-99.
Product Data Integration Technologies, Inc., Step Integratin Authors, printed on Apr. 26, 1999.
Sullivan, Scoring Borrower Risk, Mortage Banking, vol. 55, No. 2, Nov. 1994, pp. 94-98.
Spreadsheet Mapper; www.panopticon.com., printed Oct. 1, 2003.
TCS 4.20; Telsys sas; http://download.com, printed Sep. 30, 2003.
McLaughlin, Tapping Web to Search for Right Fund—FundProfiler Speeds Search, Boston Herald, Boston, MA, Dec. 16, 1999, p. 70.
Carey, The Sub-Prime Credit Market: Identifying Good Risks for Unsecured Cards, Credit World, vol. 85, No. 1, Sep. 1996, pp. 13-15.
Portner, There Must be a Better Way, Mortgage Banking, vol. 53, No. 2, Nov. 1, 1992, pp. 12-22.
Trading and Capital-Markets Activities Manual, Instrument Profiles: Structured Notes, Federal Reserve System, The Turin Group, www.toerien.com/books/manual/4040.htm, printed Jul. 24, 2002, 14 pages.
Storms, Phillip, Using Mortgage Credit to Achieve Client Objectives, Journal of Financial Planning, ISSN/ISBN: 10403981, Proquest Document Id: 10403981, vol. 9, Issue 5, 9 pages, Oct. 1996.
Hickman, Using Software to Soften Big-Time Competition, Bank Systems and Technology, vol. 31, No. 8, Jun. 1994, pp. 38-40.
Spoerri, Visual tools for information retrieval; Visual Languages; 1993; Proceedings; 1993 IEEE Symposium on; pp. 160-168; Abstract.
Spirer, When Bad Credit Behavior Becomes the Norm, Credit World, vol. 85, Iss. 6, Jul./Aug. 1997, p. 18.
Why a Fund of Funds?, Altegris Investments, www.managedinvestments.com/hedge_fund_of_funds, printed Jul. 24, 2002.
Anonymous, Kmart Mastercard—cardweb.com 2000.
Anonymous, Two Chips Can Be Better Than One.
Hinds, Michael, Making the Most of Fast Falling Mortgage Rates.
Jazzy Jeff, Credit Card Commentaries; cardoffers.com 2003.
Reid, Alice, Metro Ready to Use High Tech Far System; Selling.
"In Time of Need: A National Strategy for Disaster Relief Cards," prepared by JPMorgan Chase Treasury Services—Public Sector, Jan. 26, 2007.
5500—FDIC General Counsel's Opinion No. 8—Stored Value Cards, 61 Fed. Reg. 40490, http//www,fdic.gov/regulations/laws/rules/5500-500.html, Aug. 2, 1996.
Song, A Card That Asks for Id, Time Magazine, Apr. 12, 2004, 1 page.
A Store Card Issuer Looks for Lift from Electronic Gift Certificates, Credit Card News, Feb. 1, 1995, 2 pages.
Claessens, et al., A Tangled World Wide Web of Security Issues, First Monday, retrieved from the internet at http//www.firstmonday.org/issues/issue7_3/claessens, retrieved from the internet on Oct. 6, 2006.
Anonymous, CardTrak Online, Coca-Cola ATM money Cards, Apr. 4, 1997.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.

(56) References Cited

OTHER PUBLICATIONS

Abstract to 2007 JPMorgan Chase Disaster Response Card National Strategy Plan Abstract, Jan. 26, 2007.
Siegel, Joel G., et. al., Accounting Handbook (1995).
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
The State of Arkansas, Arkansas Code of 1987 Annotated (1999).
Associates First Capital Corporation, Hoover's Inc., The Industry Standard the Newsmagazine of the Internet Economy, thestandard.net/companies/company-display, Apr. 6, 1999.
Anonymous, Association of Inventive Gift Certificate Suppliers, Aug. 1, 1995.
Authorization of Financial Agent and Terms of Performance, Debit Card Application for Houston, Texas, Sep. 1991, acs00277412.
E-Loan, Auto Loan Rates, (1997).
Award Card Comparison, JA7922, Nov. 1, 1995.
Plotnick, Jennifer, Bakersfield Calif Investors Explore Buying Rental Property Apr. 11, 2004.
Brehl, Banks issue cash-card pledge, The Toronto Star, Oct. 9, 1997, 1 page.
Block, Valerie, Blockbuster running test of a stored value card, The American Banker, Sep. 1, 1995.
Board of Governors of the Federal Reserve System—Report to the Congress on the Application of the Electronic Fund Transfer Act to Electronic Stored-Value Products, May 1997, acs00098020.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
Cheney, How Effective Were the Financial Saftey Nets in the Aftermath of Katrina, HurricaneKatrinaJan06, Jan. 2006.
Card Based Award Systems, JA8309, Nov. 1, 1995.
CardEx Incentives, www.cardex.com, Apr. 6, 1999.
CardFlash, Apr. 5, 2005.
Vandenengel, Cards on the Internet Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks a Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Haddad, Charles, et. al., Congratulations, Grads—You're Bankrupt; A Marketing Blitz Buries Kids in Plastic and Debt, May 2001.
Consortium created to manage common electronic purse specification, Cardtech Securtech, Chicago, www.visa.com/av/news/PRmisc051199.vhtml, May 11, 1999.
Hight, Jim, Consulting Services, www.strategies-tactics.com, Oct. 15, 2002.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.

Lamond, Credit Card Transactions Real World and Online, Paying by Credit Card-Real World and Online, http//www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
CardFlash, Cardweb.Com, Daily Payment Card News (2004).
Sherer, Paul M., Deals & Deal Makers: Web Ventures Seek to Facilitate Business Credit, Private Equity, Nov. 8, 1999.
Debit Card News—Paperless Trail Leads Debit to a Check-Free Payroll Program, vol. 3, No. 12, Dec. 16, 1997.
Debit Card Services—Invitation for Expressions of Interest, Jul. 1991, acs00277422.
Piskora, Debit Cards Seen Poised for New Markets, American Banker, Credit/Debit/ATMs, Mar. 7, 1995, p. 16.
Debit and Stored Value Cards for Government: A Growing Trend but States Could Do More, A Survey and White paper of the EBT Industry Council, Nov. 2006.
Definition of Store-Value Card, Wikipedia, retrieved from the internet at http//en.wikipedia.org/wiki/Stored-value_card, retrieved from the internet on Apr. 16, 2007.
Direct Payment Card, International EBT Pilot Evaluation Pilot Evaluation—Argentina, Jan. 1996, acs00277456.
Lennox, Graeme, Don't Be Tempted by the Urge to Splurge: Zero Rates Sound Great But You'll Pay Dearly in the End, Jul. 2001.
E-Z Pass, Web page, http//www.ezpass.com-Disc_portNewYork.html, Nov. 12, 2001.
E-Z Pass, Web page, http\\www.ezpass.com-Disc_ny_annual.html, Nov. 12, 2001.
E-Z Pass, Web page, http \\www.ezpass.com-frameMain.html, Nov. 12, 2001.
E-Z Pass, Web page, http \\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
FOIA # Sep. 2, 2012 Responsive Records Book #11, Mar. 12, 2009, acs00279715.
FOIA # Sep. 2, 2012 Responsive Records Book #2, Mar. 12, 2009, acs00277515.
FOIA # Sep. 2, 2012 Responsive Records Book #3, Mar. 12, 2009, acs00277531.
FOIA # Sep. 2, 2012 Responsive Records Book #5, Mar. 12, 2009, acs00278229.
FOIA # Sep. 2, 2012 Responsive Records Book #7, Mar. 12, 2009, acs00278754.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, Call 1-800-555-2535, First USA, 6 pages (1997).
First USA—Call 1(800)335-2453 to Receive One Free Hour of Domestic Long Distance Calling (No Strings Attached), pages (1997).
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.

(56) References Cited

OTHER PUBLICATIONS

Roberts, Leigh, Fnb and Nedcor Launch Into the New Era of Smart Card Banking Nov. 15, 1998.
E-Loan, Frequently Asked Questions (2001).
Frequently asked questions, Ecard, www.eregard.com, printed Sep. 23, 2001, 7 pages.
Glossman, et al.,, Glossman, et al., Citicorp Company Report, Report No. 1647151, p. 8 of 16, May 9, 1987.
Ostroff, Jeff, Guide to Buying New Cars, ed Cars, Dealer Scams (2001).
Hamey, Kenneth, Hamey, Home Asset Management Accounts Link Mortgages Equity Lines [Final Edition], The Washington Post, Oct. 5, 2002.
Hargreaves, The Evaluation of the Expanded EBT Demonstration in Maryland, Final Report, May 1994, acs00092018.
Machlis, Have it the smart way Burger King program drives smart-card use, Computerworld, printed Feb. 23, 2001, 1 page.
Here's the calling convenience you asked for 1-800-call-ATT . . . For All Calls, AT&T, Appendix A for Card Carriers, 1999, 7 pages.
Hoovers, General Mills, Inc. Corporate Profile relied upon to show the history of the company, http/cobrands.hoovers.com/global/cobrands/proquest/history.xhtml?COID=10639, Jul. 12, 2005, 2 pages.
How Is It Different?, JA8331, Jul. 2000.
Konrad, IBM Had a Bunch of Unusual Ideas in 2003, www.philly.com; printed Jan. 21, 2004, posted on Jan. 13, 2004, 2 pages.
Incenticard, Bellsouth, JA8329, Jul. 2000.
Judy Quinn, Incentive Cards Explained, Incentive, Dec. 1995, 5 pages.
Incentive Firms Find Debit Cards a Rewarding Experience (Off-line debit card issuers converge efforts with companies looking for effective incentives to boost employee productivity and to motivate individuals to buy their products), Debit Card News, vol. 3, No. 11, Nov. 28, 1997.
Vincent Alonzo, Incentive Marketing . . .Three If by Smart Card, Incentive Sep. 1995, p. 11.
Incentive gift Card Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta Marketing & Design Product Concept Report, Oct. 9, 1996, 15 pages.
Introducing the First USA Platinum Connect Card, First USA Promotional Mailing, Dec. 1997, 2 pages.
Request Information for Electronic Benefit Transfer (EBT) Services Dept. of Health and Human Services Aug. 2006_Final JPM DHHS 2006_Final (2006).
Alaska Hoing Finance Corporation Quarterly Unaudited Financial Statements with Summarized Financial Information for Jun. 30, 2004, and Request for Information Banking Services, Bates Nos. ACS-00000143-ACS-00000231, Mar. 31, 2005.
Kilian-Kehr, Roger, Kilian-Kehr, Mobile Security with Smartcards, Dissertation, Apr. 8, 2002.
Key Bank Holiday Offer, http//www.key.com/swiftgift/home.html, printed Apr. 5, 1999.
Kibble-Smith Statement to Hoe Committee on Ways and Means, Apr. 5, 2006.
Kleege, Stephen, Kleege, Visa Unveils CoBranding Offensive (Visa International, Visa U.S.A. Inc.), American Banker, v. 159, n. 43, Mar. 4, 1994 (www.dialogclassic.com/MainFrame.jsp, pp. 1-3)
Lewis, David, Lewis, Mortgage Lending Optimized, IntternetWeek, Issue 858, Apr. 23, 2001.
LexisNexis Academic, Debit Card Innovation, vol. XXXV, No. 5, p. 2, May 1997.
LexisNexis Academic, Debit Cards Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
Power, Denise, Loehmann's Compiles Shopper Data Via Credit Card, vol. 28, No. 3, pp. 6, Jan. 1998.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, p. 111.
Meridian Award Cards, JA8251 (1995).
Meridian-the leader in card marketing, JA8343 (1995).
Meridicard vs. Debit Cards, JA7917 (1995).
Clark, Microsoft, Visa to Jointly Develop PC Electronic-Shopping Software, The Wall Street Journal, Nov. 9, 1994, WSJ B9.
Modification # 1 to the Authorization of the Financial Agent and Terms of Performance, Sep. 30, 1993, acs00277482.
Modification # 2 to the Authorization of the Financial Agent and Terms of Performance, Mar. 25, 1994, acs00277490.
Modification # 3 to the Authorization of the Financial Agent and Terms of Performance, Feb. 25, 1995, acs00277500.
Modification # 4 to the Authorization of the Financial Agent and Terms of Performance, Apr. 1, 1996, acs00277507.
More Retailers Turn to Co-Branding, Chain Store Age Executive with Shopping Center Age, Feb. 1, 1995, 3 pages.
New 1-800-Call-ATT Campaign Promotes One Number For All Calls, AT&T Marketing, News Release, www.att.com/press/0297/970217.csa.htm, Feb. 17, 1997, 2 pages.
Schwab, Charles, Now 7 Ways for a better Total Return for Your Money Schwat 1, The Inventor's Asset Management Account, Charles R. Schwab, Charles Schwab & Co., Inc., 16 pages (1987).
Allen et al., Overview of Smart Cards and the Industry, Smart Cards Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Feldman, Judy, Pay by Check Over the Phone or Net, Oct. 1999.
Dugas, Payroll May Ask Paper or Plastic?, USA Today, 3B, Aug. 14, 2001, 1 page.
Youll, James, Peer to Peer Transactions in Agent Mediated Electronic Commerce, Aug. 2001.
Wolf, Harold A., Personal Finance (1981).
Proton world and Europay to co-operate in creation of new CEPS-compliant e-purse application, Press Release 1999, Waterloo, Belgium, Jun. 28, 1999, 2 pages.
Brown et al., Purchasing Card Magic Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http//perso.wanadoo.fr, printed Feb. 23, 2001, 1 page.
Miller, Section E.2.1 Kerberos Authentication and Authorization System, Project Athena, Cambridge, MA, Dec. 21, 1987, 39 pages.
Sessums, Unbanked Citizens Draw Government Attention, vol. 9, No. 4, (1997) acs00280762.
Souccar, Smart Cards 1st Union Smart Card Pilot Enlists a Second Army Base, American Banker, Digital Frontiers, vol. 164, No. 61, Mar. 31, 1999, 3 pages.
Smart Cards Big Brother's Little Helpers, The Privacy Committee of New South Wales, No. 66, Aug. 1995.
Unknown, Smart Cards Forging Into Credit Card Market, vol. 10, Issue 6, Apr. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards Costly Private Substitutions for Government Currency, Economic Quarterly, 1996, Economic Quarterly, v82, n3, p1 (25), ISSN 1069-7225, 17 pages.

(56) References Cited

OTHER PUBLICATIONS

Lazarony, Stuck for a gift? Give a prepaid credit card, www.bankrate.com, Dec. 21, 1998, 1 page.
Rossman, Kenneth, Summary Appraisal of Real Property, Feb. 15, 2002.
Key, Swift Gift 'Wows' Internet Shoppers, PR Newswire, www.key.com/swiftgift/home.html, Dec. 2, 1998, 1 page.
American Bankers Association, The Bank Credit Card Business (1996).
The Campus Card Conundrum, Card Technology, Journal ISSN 1093-1279, p. 25+, Feb. 1998, pp. 1-8.
The Electronic Purse Reaches the Car Park, http \\docs.vircom.net/mobility/parking, printed Feb. 23, 2001, 2 pages.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment Overview, p. 10-20 (1998).
Stoughton, The Gift of Credit, www.washingtonpost.com/wp-srv/business, Dec. 14, 1998.
Nilson, H. Spencer, The Nilson Report, Issue 680, Nov. 1998.
Nora Wood, The Power of the Card, Incentive, Jul. 1997, 6 pages.
Stuber, The electronic purse an overview of recent development and issues, Bank of Canada, Technical Report No. 74, www.bankofcanada.ca, Jan. 1996, printed Feb. 23, 2001, 2 pages.
Understanding the benefits Smartcity offers a number of important benefits to both the card issuers and their customers, http//www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Unknown, Unknown, Thai Smart Card to Expand Abroad (Smart Loyalty's Smart Bonus Program has 300,000 Cardholders in Thailand, the company plans to expand into markets that include Australia and Malaysia), Cards International, n. 183 p. 5, Sep. 22, 1997.
Yee, Bennet, Using Secure Coprocessors, School of Computer Science Carnegie Mellon University, May 1994.
Vivo Tech, ViVOtech, Inc. RF-Based Contactless Payment: A more convenient way to pay, Apr. 2004.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Wood, John et al., Electronic Transfer of Government Benefits, Federal Reserve Bulletin, pp. 203-217, Apr. 1997.
Welcome to Card Express CardEx, CardEx website archived by web.archive on Oct. 31, 1996, http//web.archive.org/web/*/http//www.cardex.com, retrieve Oct. 18, 2003, 7 pages.
Welcome to Card Express, The CardEx Incentive Card, as disclosed in the CardEx web site archived by web.archive.org on Feb. 7, 1998, http//web.archive.org/web/*/http//www.cardex.com, retrieve Oct. 18, 2003, 8 pages.
Swiftgift, Welcome to Swiftgift, www.swiftgiftcard.com, Dec. 8, 1998, 10 pages.
Bowen, Cathy, Welfare Agencies Seek Aid From Smart Cards, Oct. 7, 2002.
Wells Fargo Blazes New Trail for Homeowners, Oct. 2002.
Wenninger et al., The Electronic Purse, Current Issues in Economics and Finance, vol. 1, No. 1, Apr. 1995, acs00098037.
Kenneth Hein, What's the Deal?, Incentive, Jul. 1998, 7 pages.
Machlis et al., Will smart cards replace ATMS?, Computerworld, printed Feb. 23, 2001, 3 pages.
Unknown, HyperSecur Corporation's HyperProximity Technology Now Available on ST16HF52 Microprocessor Chip From STMicroelectronics Business and High Tech Editors CardTech/SecurTech 2000, Business Wire. New York: May 2, 2000. pp. 1.
Pullar-Strecker, Kiwi card converts unlikely to lead smart revolution; Little support for changes to risk allocation; [2 Edition] Puilar-Strecker Tom. Dominion. Wellington. New Zealand, pp. IT. 6, Apr. 25, 2000.
Redman, Mondex trial whets consumers' e-cash appetite Russell Redman. Bank Systems & Technology, New York, vol. 37, 155. 6; p. 16, 1 pp. 5, Jun. 2000.
Church, Technology Takes the Toll Church, Vernon M. Popular Science. New York, vol. 240, Issue 3; p. 78, 3 pgs, Mar. 1992.
Reid, "Metro ready to use High Tech Fare System, Selling Smart Cards from Internet Site to Initiate Era of Cashless Commuting", The Washington Post, Washington DC, pp. B02, Mar. 12, 1999.

* cited by examiner

SYSTEM AND PROCESS FOR PERFORMING PURCHASE TRANSACTIONS USING TOKENS

PRIORITY

The present application claims priority to Provisional Application Ser. No. 60/368,155, filed on Mar. 29, 2002.

FIELD OF THE INVENTION

The present invention relates generally to authentication tokens used for performing purchase transactions and other functionality, and more specifically to radio frequency identification devices for performing purchase transactions with an automobile as a trusted entity.

BACKGROUND OF THE INVENTION

Technologically new payments mechanisms have often been frustrated by the famous 'chicken or the egg' conundrum. Until there are lots of consumers with the new devices, merchants are reluctant to pay the cost of installing new readers for the technology. Similarly, consumers are reluctant to carry new devices until there are enough merchants to accept them. Despite increasing fraud associated with criminals 'stripping' the information from magnetic-stripe cards, the card associations have failed to deploy more secure alternatives. Smartcards are just one example of the devices that have failed to gain traction. The invention described here addresses this conundrum.

RFID technology is very broadly used today. RFID devices are currently used to identify: cattle; packages; owners of vehicles and for payments (e.g. the 5 MM active Exxon Mobil SpeedPass users). The technology is available in two forms, active and passive RFID devices.

E-Z Pass is an example of an active RFID device. In order to permit cars to be recognized at speeds up to 200 MPH, such active RFID devices have a battery and in response to a signal from readers, transmit a signal that can be recognized from a distance of 40 meters from the reader. At such distances, it is important that only the intended vehicle is charged for the toll. As a consequence, a lot of technology is focused on tracking a particular vehicle within a specific lane of traffic.

One large implementation of RFID technology is connected to passive devices. Passive RFID devices have no battery. These devices contain chips and an antenna. When the passive RFID device is in proximity of a reader, usually within inches but can be feet away, the chip is activated by an RF signal sent by the reader. The reader's broadcast RF signal is captured by the passive device's antenna and generates sufficient electrical energy to activate the chip. The passive RFID chip is hardwired to respond in a particular way, to be recognized by the reader.

Payments using RFID devices are beginning to emerge, though there are two impediments: merchants have balked at the $5,000-15,000 cost of installing RFID readers, because there are few RFID enabled consumers; and, issuers are reluctant to distribute tokens (at a cost of $8 each) unless there are enough merchants to generate sizeable payments.

The leading RFID payments providers include EZPass, Speedpass, 2Scoot and Freedompay. The primary goals for these entities are: to broaden as quickly as possible the number of merchants that accept RFID tokens; and to permit consumers freedom to choose multiple payment alternatives with a single token.

Many of the Exxon Mobil gas stations are Speedpass enabled. In addition, a number of McDonalds restaurants in the Chicago area are now using Speedpass payments, and one grocery store chain began piloting Speedpass in late 2002. However, even with all this new development, RFID payments are still rare.

Other drawbacks may also be present.

SUMMARY OF THE INVENTION

Accordingly, one aspect of the invention is to address one or more of the drawbacks set forth above.

Automobiles (or active communications devices) could be certified as trustworthy in applying and enforcing policies and procedures that will provide an environment for secure payments and other transactions. Current automobile design, including the use of electronic engine controllers (each of which have their own unique electronic identity) could be adjusted to include such functionality, and permit each particular car to include with each payment assurance proferred to counterparties its cryptographic certification electronically. The certification, could be standardized so the counterparties could clearly understand the level of trust applicable to a particular car. The car could also act as a conduit, trusted because of its certification to pass the credentials of the RFID device through to counter parties.

According to an exemplary embodiment of the invention, a system for performing at least one payment transaction includes a token having a unique identifier associated with a user or key of a particular automobile, where the automobile is held out as an entity trusted by merchants and the token interacts with a reader in the automobile to perform the at least one payment transaction and at least one account associated with the token, where the at least one account makes payments as directed by interaction of the token and the automobile reader.

According to a further exemplary embodiment of the invention, a system for registering a token includes means for receiving a unique identifier from the token, where the token and the unique identifier are associated with a user or key of a particular automobile, the automobile is held out as an entity trusted by a merchant and the token interacts with a reader to perform the at least one payment transaction, means for creating at least one account associated with the token, where the account includes account information and makes payments as directed by interaction of the token and the reader, means for receiving terms for the at least one account and means for storing the account information and the terms of the at least one account.

By way of another exemplary embodiment, a process for registering a token is provided, where the process includes receiving a unique identifier from the token, where the token and the unique identifier are associated with a user or key of a particular automobile, the automobile is held out as an entity trusted by a merchant and the token interacts with a reader to perform the at least one payment transaction, creating at least one account associated with the token, where the account includes account information and makes payments as directed by interaction of the token and the reader, receiving terms for the at least one account and storing the account information and the terms of the at least one account.

Another embodiment of the invention provides a computer readable medium having code for causing a processor to register a token. The medium includes code for receiving a unique identifier from the token, where the token and the unique identifier are associated with a user or key of a particular automobile, the automobile is held out as an entity trusted by a merchant and the token interacts with a reader to perform the at least one payment transaction, code for creating at least one account associated with the token, where the account includes account information and makes payments as directed by interaction of the token and the reader, code for receiving terms for the at least one account and code for storing the account information and the terms of the at least one account.

DETAILED DESCRIPTION OF THE INVENTION

A system and process for using a token for performing purchase transactions is described. The system and process makes use of existing tokens distributed for other purposes or for purposes of payment, as well as newly distributed tokens, such as radio frequency identification devices, to perform purchase transactions. One technical effect of the invention is to provide a system and process for performing purchase transactions using, among other items, a radio frequency identification device, as set forth in the Brief Description of the Invention, above and as more fully described here in the Detailed Description of the Invention. Various aspects and components of this system and process are described below. While the present invention is described in terms of tokens, and radio frequency identification devices in particular, it is recognized that other types of tokens may also be used.

The invention relates to a method and process by which an existing and large network of devices, as well as newly distributed devices, can be used by consumers to authenticate themselves, and permits each consumer to apply any of the various payments mechanisms available to him. The existing broadly distributed network is active and passive radio frequency identification ("RFID") devices held by consumers.

Figure 1:
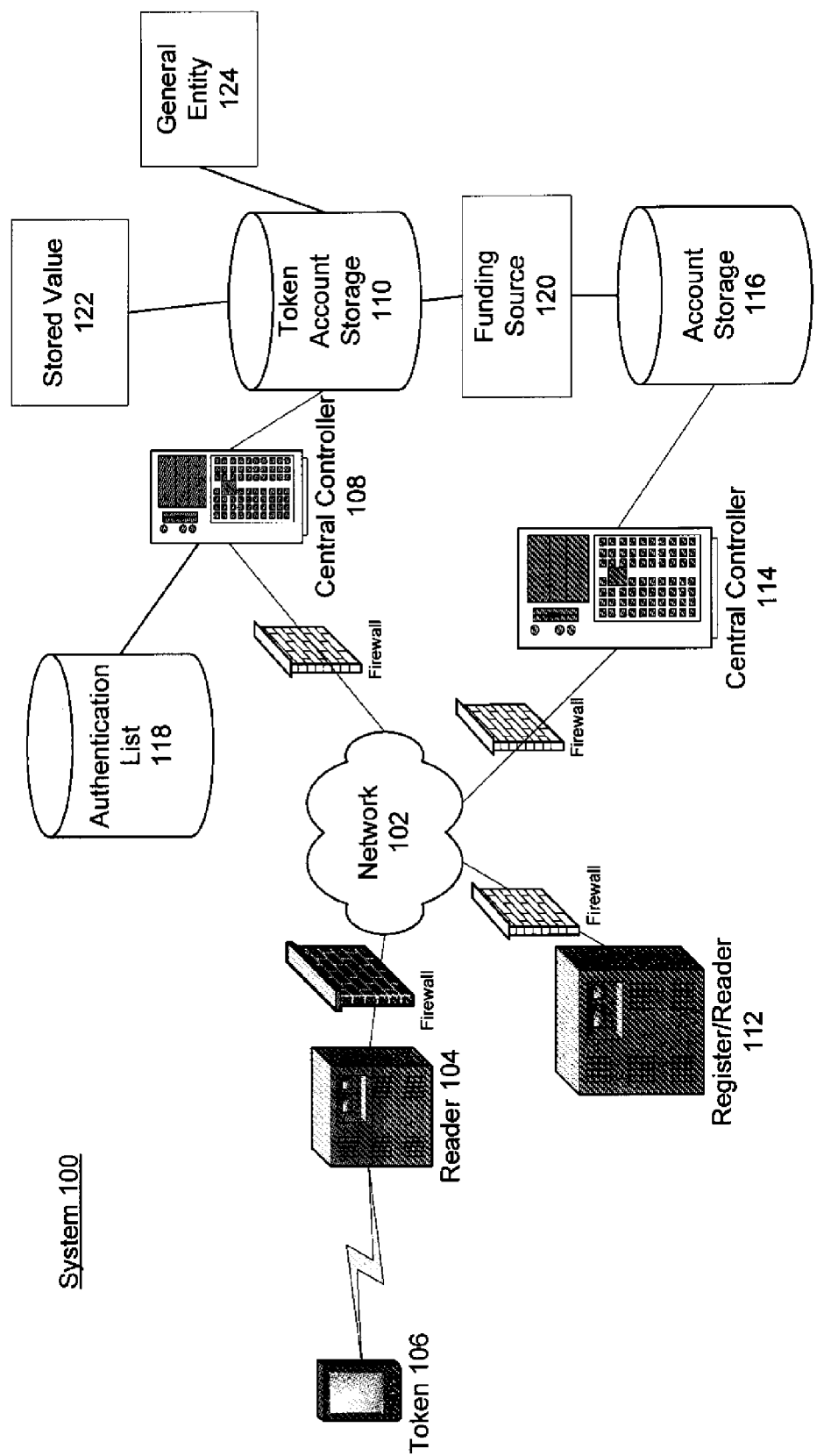
FIG. 1 illustrates a system for performing purchase transactions with a token according to an embodiment of the invention.

FIG. 1 illustrates a system for performing purchase transactions with a token according to an embodiment of the invention. System 100 includes a network 102, such as the internet, or other type of network. Reader 104 reads token 106. In the example illustrated in FIG. 1, token 106 is an RFID device and reader 104 is equipped to read the RFID. However, it is recognized that other tokens may also be used. Further, while only one of each item is described for the convenience of explanation, it is understood that multiple devices may be used within the system 100.

System 100 also includes a central controller 108 and a token account storage device 110. Central controller 108 connects with network 102 and interfaces between network 102 and token account storage device 110. Token account storage device 110, which may include one or more devices, stores information about the accounts associated with token 106. Each token 106 has a unique identifier associated with the token. Further, one or more accounts are associated with the token 106. Accounts may include a specific account associated solely with the token 106. This account may store funds, such as a stored value card, or may have a line of credit that is paid off periodically, such as a credit card. Further, other accounts may also be associated with the token 106, such as debit accounts, credit card accounts, and other types of financial accounts. Token account storage device 110 may communicate with funding sources 120 to perform the purchase transaction. According to an embodiment of the invention, payment may be made directly by a transfer of funds from the user of the token to the merchant operating the reader, such as by a transfer of funds from a financial account of the user to the financial account of the merchant. Thus, a direct payment may be made with relatively little time delay.

According to an embodiment of the invention, indirect payments may be made, with an entity trusted by a merchant serving to act as an intermediary guaranteeing payment. Payments are not made immediately, but the intermediary guarantees the merchant will be paid, thereby facilitating the performance of the purchase transaction. By way of example, an automobile manufacturer may provide a service (e.g., On Star provided by General Motors) to purchasers of the automobile that provides road-side assistance, navigation assistance, and the like. The service may also provide a guarantee of payment to a merchant on behalf of the automobile owner. The merchant than may move forward with the purchase transaction, while the actual payment is made at a later time.

According to an embodiment of the invention, funding sources 120 may include any source of funds, such as a bank, lender, company, or any other source of funding, such as institutions associated with financial accounts. Further, stored value device 122 may contain funds for performing purchase transactions. For example, funds from a financial account may be transferred into stored value device 122 and then accessed to perform a purchase transaction. According to an embodiment of the invention, funds from stored value device 122 may be used to perform certain types of purchase transactions (e.g., certain merchants, transactions below a certain monetary threshold, etc.). General entity 124 is accessed by token account storage 110 to enable other transactions to be performed, such as accessing medical records, and transferring information.

An example of passive RFID technology is the anti-theft technology used by auto companies. Historically, car keys depended on simple mechanical locking systems. Cars have increased in value, and now these simple mechanical systems provide inadequate security. Today, most cars use both a mechanical locking system and an RFID authentication system. In addition to the standard mechanical lock, car companies have provided a much more rigorous electronic protection mechanism. Keys contain RFID chips, and built into the ignition switch is an RFID reader. Even if the mechanical key is replicated, unless the RFID reader validates the key, the car will not start. The engine controller, an electronic chip buried deep within the engine itself, must recognize the RFID device or the engine will not start.

Many passive RFID tokens for the automotive industry use automotive anti-theft 'cryptographic challenge/response protocol.' This protocol used by auto companies does not rely on a singular ID number hardwired into every RFID device. However, that singular identity number is always accessible using a standards based (QS2000) protocol. It is that identity number that is used for all Speedpass and 2Scoot devices. The RFID identity number is unique and can be used to access any payments system available to the owner of the token. An RFID device may use a standard protocol to provide a transport mechanism for information, such as the frequency of the RFID device, etc. According to an embodiment of the invention, security protocol may also be proprietary to a receiver.

However, non secret information may be available to all, such as that every RFID device has unique number and that the unique number is necessary for access.

Authentication list 118 determines if reader 104 and/or token 106 is authentic and permitted to perform transactions. Authentication list 118 may be used as security to reduce the chances of fraud. According to an embodiment of the invention, token 106 may include information about the address (e.g., interne address) of central controller 108. Reader 104 may then access central controller 108 to perform the purchase transaction. Authentication list 118 may be accessed to ensure that token 106 is allowed to perform a transaction. For example, authentication list 118 may contain a list of tokens 106 that are in good standing, or that are delinquent. While FIG. 1 illustrates authentication list 118 in communication with central controller 108, it is understood that authentication list 118 may be in communication with or resident on reader 104 and/or register/reader 112. Authentication list 118 may also ensure that reader 104 is allowed to access central controller 108. According to an embodiment of the invention, authentication list 118 may also include a list of authorized readers and register/readers that are permitted to access central controller 108.

System 100 of FIG. 1 also includes a register/reader 112. It is understood that while the reader 104, and the register/reader 112 are included in system 100, other types of readers and devices for token 106 to interact with network 102 may also be used. Further, various functionalities may be provided by register/reader 112 as necessary to implement one or more aspects of the present invention. Register/reader 112, described in greater detail in FIG. 2 below, enables a user to register a token, register a financial account to be associated with the token, provide terms for purchase transactions and other information.

Figure 2:
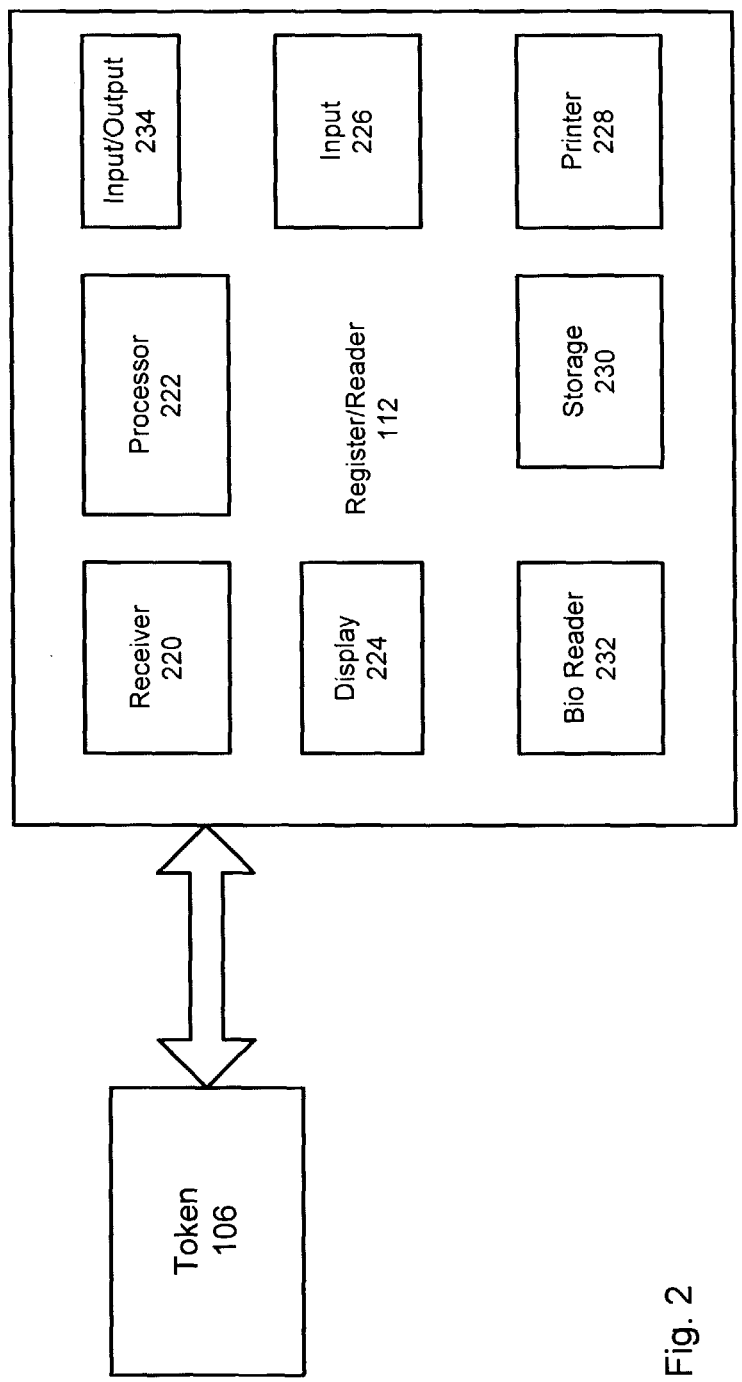
FIG. 2 illustrates a system for a reader and register according to an embodiment of the invention.

FIG. 2 illustrates token 106 in communication with reader/register 112. According to an embodiment of the invention, reader/register includes a receiver 220, processor 222, display 224, input 226, printer 228, storage 230, bioinformatics reader 232 and input/output 234. According to the embodiment illustrated in FIG. 2, token 106 is an RFID device. Receiver 220 receives signals from token 106 and transmits signals to token 106. The signals are converted and sent to processor 222 for appropriate processing. Information from the processing may be displayed at display 224. Display 224 may include a RGB monitor or other manner of displaying information. For example, display 224 may display the amount of the purchase transaction, and, where token 106 has a plurality of accounts associated with it, a selection of which account to perform the purchase transaction. Other functionalities, such as a security and encryption, customer loyalty programs, and approval lists, may also be available in register/reader 112.

Input 226 enables a user to interact with register/reader 112. Input 226 may include a keyboard, touch-screen, mouse, number pad or other manner of inputting information. For example, where token 106 has a plurality of accounts associated with it, display 224 may display options for the financial accounts to perform the purchase transaction. The user can select the appropriate financial account using input 226. At the conclusion of the purchase transaction, a receipt may be printed by printer 228.

Information from the purchase transaction is stored in storage 230. Information may then be transmitted through input/output module 234 to the network. For example, information may be stored in storage 230 for a set period of time, and then communicated to purchase transaction account storage 116 (e.g., hourly, daily, weekly, monthly, etc.).

In addition, bio-metrics module 232 provides bio-metric information about the user of the token 106. Bio-metric module 232 may be a retina scan, a finger print reader or other manner of providing bio-metric information. According to an embodiment of the invention, for some information and transactions, it may be desirable for the user of token 106 to confirm his or her identity. This may be confirmed by providing bio-metric information, by entering a personal identification number ("PIN") through input 226, or through other manners of confirmation.

For example, at a bank, office or store, a register/reader station for RFID tokens may have side-by-side a normal magnetic-stripe reader and a RFID reader. The process by which a credit card holder could register his personal car key may involve swiping the credit card, touching the RFID token, for example the car key, and presenting the credit card and signature, for validation by an attendant.

Invisible to the customer would be a pre-authorization check of the credit card, and registration of the card with the token's unique identification number. The registration will cause the particular credit card to become the default payment mechanism for the token. In addition to the signature check, other information could be captured at registration, e.g., social security number, mother's maiden name, address, car license plate number, etc. The goal of registering the token may be to obtain VISA, MasterCard, American Express, or other credit card approval that the token is as secure as a card present transaction and thus entitled to the same interchange. Additionally, registering the token may occur in a closed loop environment, where an outside financial network, such as credit card network, is not involved.

Central controller 114 of FIG. 1 also provides an interface between network 102 and account storage 116. Information from reader 104 and/or register/reader 112 is transmitted to central controller 114 to be stored in account storage 116. Information to be stored may include details regarding the purchase transaction, as well as other statistics. For example, purchase transaction information may be stored in account storage 116 for a set period of time, and then communicated to token account storage 110 to finalize the purchase transaction (e.g., daily, weekly, monthly, etc.). Alternatively, account storage 116 may communicate directly with funding sources 120 to finalize the purchase transaction.

The invention encompasses a means by which a consumer can register his RFID car key, to permit him to authenticate himself to a payments network and to execute payment transactions. Registration might be as simple as swiping his credit card, and immediately subsequently having his car key's RFID number read. At the same time, the owner of the car key can be asked for pertinent personal information. Some credit card companies may be more comfortable if the consumer executes a signature at the same time. A further means of assuring the correct user is registered would be to mail a temporary PIN to the credit cardholder's home address. Another means to verify the registration might be to validate with the department of motor vehicles that the registrant is in fact an owner of the specified vehicle. With one card registered to the RFID car key, it should be easy asynchronously to register his other bank/credit cards, so long as the mailing address is the same.

Figure 3:
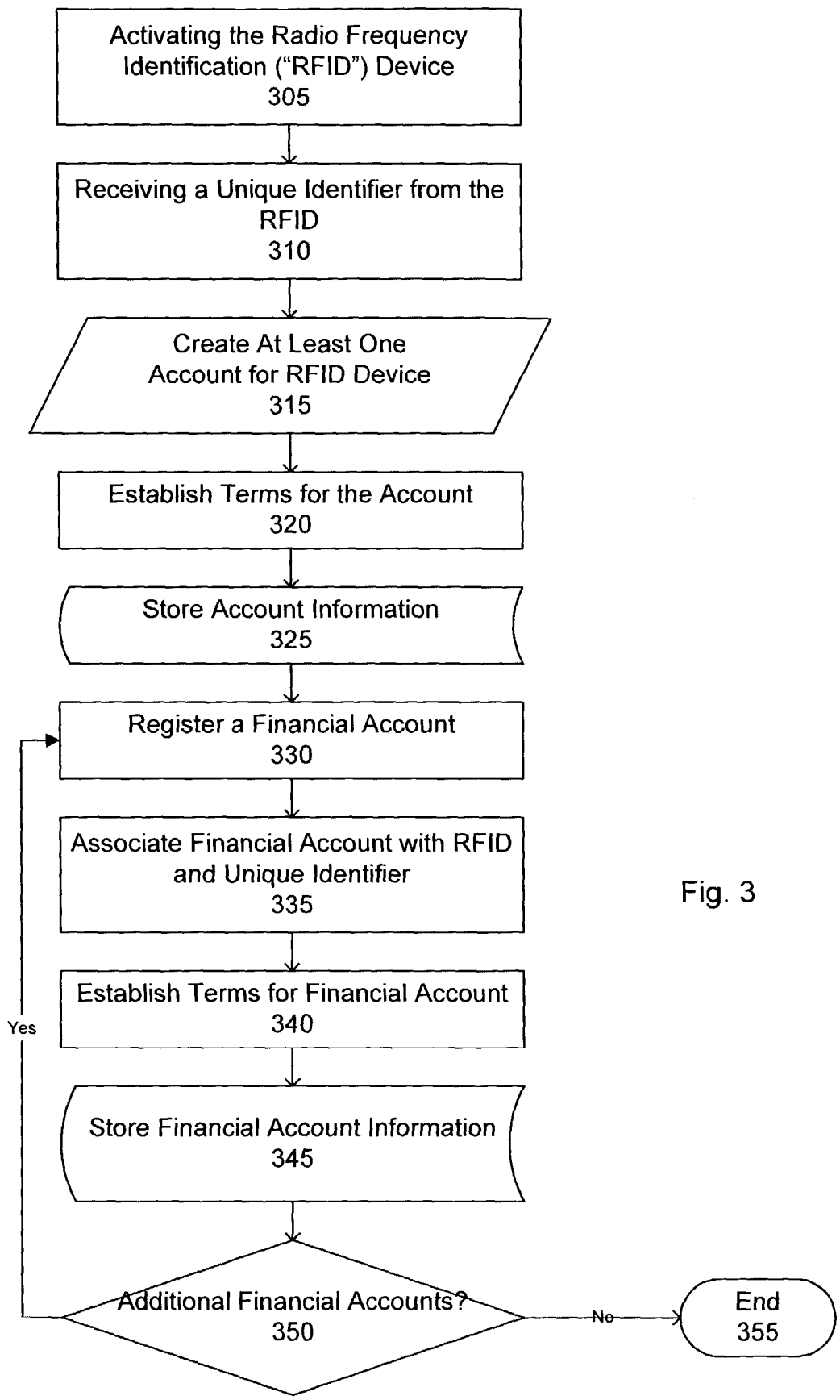
FIG. 3 is a flow chart illustrating a process for performing token and account registration according to an embodiment of the invention.

FIG. 3 is a flow chart illustrating a process for performing token and account registration according to an embodiment of the invention. At step 305, an RFID device is activated. Although the example illustrated in FIG. 3 used an RFID device as the token, it is understood that other types of tokens may also be used. Activation of an RFID device may include transmitting a signal to a passive RFID device, communicating with a server, or activating the appropriate power source in an active RFID device. According to an embodiment of the invention, activation of the token, such as an RFID device, occurs when the server recognizes the RFID device, thereby enabling purchase transactions and other transactions to be performed. While the process illustrated in FIG. 3 discloses certain steps performed in a particular order, it should be understood that the present invention may be practiced by adding one or more steps to the process, omitting steps within the process, and/or altering the order in which one or more steps are performed.

At step 310, the unique identification identifier is read, and an account is created for the RFID device at step 315. The terms of the account are established at step 320, and the account information is stored at step 325. Terms may include permissions to use the account, the amount of the purchase transaction authorization for the account, the priority of the account if more than one financial account is associated with the RFID device, or other terms for performing the purchase transaction. By way of illustrative example, terms for a particular account may include authorizing purchase transactions under a particular amount without requiring a validation or confirmation. By way of another illustrative example, certain accounts may not be valid at certain times of the day, or for certain merchants. By way of a further illustrative example, one account may be set as a default, such that unless otherwise selected by the user of the RFID device, the default financial account will be used to perform the purchase transaction. Other terms may also be used. By way of another example, certain transactions may be performed using a specific financial account (e.g., under $50) or those made at specific merchants or types of merchants (e.g., purchases at gas stations).

A financial account is registered at step 330. Financial accounts may include credit card accounts, bank accounts, debit accounts, or other type of monetary accounts direct or indirect. The financial account is associated with the RFID device and the unique identifier at step 335. By associating a financial account with the RFID device and the unique identifier, the financial account may be used to perform a purchase transaction.

At step 340, the terms of the financial account are established. The terms for the financial account may be the same as those set forth above. At step 345, the information for the financial account is stored. At step 350, a determination is made whether additional financial accounts are to be registered with the RFID device. If yes, the process returns to step 330 to register the financial account. If not, the process ends at step 355.

Figure 4:
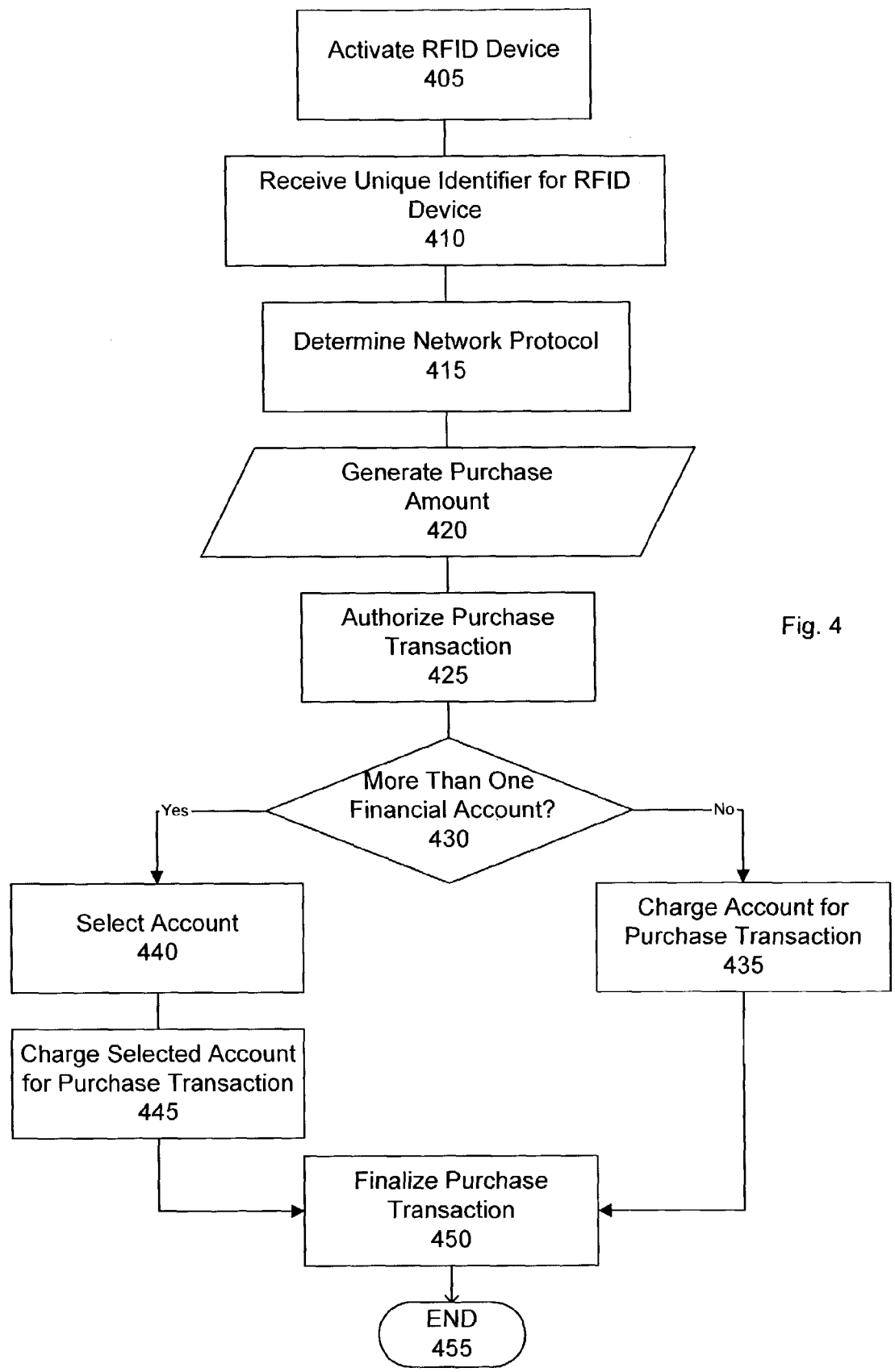
FIG. 4 is a flow chart illustrating a process for performing token and account registration according to an embodiment of the invention.

FIG. 4 is a flow chart illustrating a process for performing token and account registration according to an embodiment of the invention. At step 405, an RFID device is activated. Although the example illustrated in FIG. 4 used an RFID device as the token, it is understood that other types of tokens may also be used. Activation of an RFID device may include transmitting a signal to a passive RFID device, activating at a server or activating the appropriate power source in an active RFID device. While the process illustrated in FIG. 4 discloses certain steps performed in a particular order, it should be understood that the present invention may be practiced by adding one or more steps to the process, omitting steps within the process, and/or altering the order in which one or more steps are performed.

At step 410, the unique identification identifier is read. At step 415, the network protocol used for the particular purchase transaction is determined. According to an embodiment of the invention, different readers may operate on the same frequency, but use different protocols. A token, such as an RFID device, may be programmed in a specific protocol, and the reader may be programmed to determine what protocol is being used and process the information accordingly.

The purchase amount is generated at step 420. At step 425, the purchase transaction is authorized. Authentication may include inputting a PIN, providing bio-metric information, inputting a password, or other manner of authentication. Once authenticated, authorization may include confirming that a purchase transaction has been approved. According to an embodiment of the invention, authorization may be completed when the token is authorized at the server, such as central controller 108. As described previously in reference to FIG. 1, authentication list 118 determines if reader 104 and/or token 106 is authentic and permitted to perform transactions. Authentication list may be used as security to reduce the chances of fraud. According to an embodiment of the invention, token 106 may include information about the address (e.g., internet address) of central controller 108. Reader 104 may then access central controller 108 to perform the purchase transaction. Authentication list 118 may be accessed to ensure that token 106 is allowed to perform a transaction. For example, authentication list 118 may contain a list of tokens 106 that are in good standing, or that are delinquent. While FIG. 1 illustrates authentication list 118 in communication with central controller 108, it is understood that authentication list 118 may be in communication with or resident on reader 104 and/or register/reader 112. Authentication list 118 may also ensure that reader 104 is allowed to access central controller 108. According to an embodiment of the invention, authentication list 118 may also include a list of authorized readers and register/readers that are permitted to access central controller 108.

At step 430, a determination is made whether more than one financial account is associated with the RFID device. If only one financial account is associated with the RFID device, the account is charged for the purchase transaction at step 435. The account may be charged using any conventional process, such as that used for credit card and debit card transactions. Other manners for charging an account may also be used.

At step 450, the purchase transaction is then finalized. Finalizing the purchase transaction may include printing a receipt, confirming that the transaction has been made, or other steps used to conventionally finalize a purchase.

If there is more that one financial account associated with the RFID device, an account is selected at step 440 and the selected account is charged for the purchase transaction at step 445. Selecting an account may involve the user of the RFID device selecting the particular account, or, if no selection has been made, selecting the account designated as the default account. The account may be charged using any conventional process, such as that used for credit card and debit card transactions. Other manners for charging an account may also be used.

In the process of seeking authorization for a particular transaction, the account specified to be debited may not have adequate resources to cover the transaction. In that event, whether the account was funded on a pre-pay or post-pay basis, the Central Controller 108, could: (i) by prior arrangement, automatically top-up the account with additional resources by seeking additional credit/funds from a specified account; (ii) seek funds from any other default funding/credit accounts; or (iii) reject the transaction. Other processes may also be used.

Again, at step 450, the purchase transaction is then finalized. Finalizing the purchase transaction may include printing a receipt, confirming that the transaction has been made, or other steps used to conventionally finalize a purchase. The process then ends at step 455.

In addition to using the RFID car key or other token for making payments, the same authentication mechanism is useful generally to validate one's identity. For example, the RFID car key can be used to authenticate oneself to a virtual private network ("VPN"), or other secure networks, for physical access to premises, for buying and selling securities or other non-payment transactions, for purposes of timecards, for loyalty programs, or to one's medical insurer. The token can be used both with and without PIN, bio-metric, passwords or other identification confirmations. For lower value transactions, a consumer might choose the convenience of not requiring a PIN. For larger transactions, a consumer may choose to require the use of a PIN or bio-metric information.

Using a single device for multiple purposes will be much more convenient for consumers, who can begin to skinny down their wallets. If the token is lost, it is also easier for the consumer to revoke all his powers at once. The consumer can simply revoke the token's authorities and instantaneously all the powers of the token will be lost. As relevant information is already available, re-registering is eased as the new token need only be associated with the financial accounts.

Currently, most RFID devices operate at around 134 kHz. However, a new generation of RFID devices may operate at other frequencies, such as 13 MHz. Higher frequency devices may be less expensive to build and will permit higher bandwidth (i.e. quicker) communications. About 70% of the 40 million cars produced in 2001 were equipped with RFID anti-theft systems. The cars have an RFID reader in the ignition switch. Unless the electronic engine controller recognizes the car key's RFID token, the car will not start. According to an embodiment of the invention, various aspects of the RFID car keys make them useful as payment devices. First, each key has a unique ID number. Such car keys protect the owner's unique number much more securely than a magnetic stripe card. Second, there is a single, standard protocol that permits RFID readers to access the unique number on all RFID chips. Thus, standard RFID readers permit ordinary car keys to become trusted hardware authentication tokens. After a simple registration process, consumers may use their car keys to make payments at any store with an ordinary RFID reader.

According to an embodiment of the invention, a primary registration may require the physical presence of the token. Additional credit cards and other financial accounts with the same name and billing address could be added to the token at a registration station merely by swiping the new credit card and touching the token, one-after-the-other. Subsequent cards could also be added online, or by using a voice response unit (VRU) (though security may require some additional identification information).

Token owners can choose to use any of their available payment mechanisms at any merchant, and the owner's payment choices can be changed easily. The owner will make payment elections online or over a VRU and will be able to specify the mode of authentication required for different types of transactions, e.g. require a PIN for online or larger payments.

A token, such as an RFID device, will be accepted at any merchant that takes any RFID payments. In the simplest case, a consumer will simply bring the token close to the reader at checkout. The reader will automatically debit the payment account specified by the consumer. Consumers may specify more than one payment mechanism for a merchant. In that case, a merchant's payment wizard will select the payment mechanism with the lowest merchant discount. If the consumer has not specified a particular payment mechanism for a merchant, the default payment method will be charged.

Online purchases are also possible when a computer is equipped with an RFID reader. The incremental cost of adding that functionality to a personal computer ("PC") may be minimal. With a widely deployed base of tokens, RFID enabled PCs can offer very substantial benefits in addition to secure payments. PCs equipped with RFID readers could be used to secure data on the PC, to access secure networks, for VPNs, for remote access, etc.

According to an embodiment of the invention, consumers may be able selectively to impose additional security protections. A PIN may be required for purchases at specific stores, or for amounts larger than a specified ceiling. Consumers may also choose to impose a daily or weekly maximum aggregate spending limit. Subordinate tokens may be restricted to purchases from specific stores, or for age appropriate materials (especially useful for online purchases).

By way of an example of an embodiment of the invention, a car might be sold with one master token, registered as the property of the owner of the car. Using the master token, the owner of a car might create, authorize or reject driving privileges, payment capabilities, etc., for other users of tokens to his car. The master token holder might act as the registration agent for subordinate tokens, and could also be empowered to revoke or suspend the powers for subordinate tokens. An additional validation check before registering a master token might be to compare the credit card billing address with the address of the registered owner of the vehicle.

Similarly, a token might be registered to the owner of a house fitted with an electronic RFID lock. The house master token could be used to register other authorized users of the house. Such registration might be very simple, e.g., touch the house master token, insert a PIN and then touch the subordinate token. Subordinate tokens might have time-limited efficacy, e.g., a teenager's token might not work after his curfew.

One aspect of the RFID functionality is their use for personalization, as well as for heavier payments and authorizations. Readers are not bound by the same constraints as the passive RFID devices (size, cost, etc.). Typical RFID readers will have some source of power and be connected to some device, network, or system that takes advantage of the RFID validation, e.g., POS, EPoS, ECR, fire wall, engine controller, physical lock to premises, etc. The RFID reader may be equipped with an antenna tuned to listen for faint signals at a specific frequency, e.g., 134 kHz. More complex RF communications could simply be enabled with software. The two-way, secure communication could use RF (with the same frequency as the passive RFID device or a different one), or other protocols such as Bluetooth or 802.11.

One manner for expanding the functionality of the passive RFID device is to link its powers to an active device. Such devices might include a wire line or cellular phone, computer, Blackberry, PDA or other similar device (hereinafter also referred to as "Active Communications Device"). Such Active Communications Devices typically have power, or access to power, one or more communications channels, a CPU that is much more powerful than the passive RFID, memory that can be dynamically accessed, data entry capability and a visual display. The passive RFID token that is validated might be electrically connected to the Active Communications Device; physically attached, but not electrically connected, e.g. RFID chip embedded in the faceplate of a cell phone; or, separate from the Active Communications Device. For example, when an Active Communications Device is a mobile telephone, an RFID device may be located in face plate of the telephone. The RFID device may be a passive device, and the mobile telephone may have an RFID reader. The mobile telephone then communicates the necessary information. Alternatively, the RFID device may be physically connected to the mobile telephone, such as by electrical leads. The link between the RFID and the Active Communications Device may be established at the manufacturer, or later, by direct or indirect contact with registration authority, or over a network. Other embodiments may also be used.

Once an authenticated passive RFID is recognized and accepted by an RFID reader, the holder of the RFID device could take advantage of that trusted authentication, to engage an active device capable of more complex, secure communications. The key step to achieve this result will be to transfer the passive RFID's trusted validation, to a more capable communications device. There are many different ways for that trust to be transferred, three different examples are disclosed here.

While two examples for linking, by prior arrangement, an authenticated passive RFID device to an Active Communications Device are disclosed below (i.e., Example 1 & Example 2), it is understood that other examples are also within the scope of the present invention.

EXAMPLE 1

Secure Linking of Passive RFID Devices to Active Communications Devices

Just as a passive RFID device can be registered to enable multiple payments modes (e.g., credit cards, debit and stored value accounts, etc.), and other non-payment authorizations; RFID devices can be securely linked to other devices, including Active Communications Devices. By registering a passive RFID device with an Active Communications Device's unique identifier, that Active Communications Device can inherit all the authentication and authorization capabilities of the passive RFID device. Thereafter, the holder of a passive RFID device could use it wherever it is convenient (e.g., where a merchant's POS is capable only of recognizing a passive RFID device) and would also use the same set of capabilities using his Active Communications Device to take advantage of less limited reader capabilities where available.

EXAMPLE 2

Shared Secret Linking Passive RFID Devices to Active Communications Devices

In the case of automotive security, during secure instantiation of each token, the engine controller communicates its secret to the token. The engine controller will start the car only for 'friendly' tokens that know its secret. For example, controller A (the engine controller) shares its secret with token B (the token). Because controller A controls distribution of its secret, controller A will trust all token Bs that know its secret.

To establish a link between a passive RFID device and an Active Communications Device that can be trusted by RFID readers may be somewhat more complex. In a first embodiment, the Active Communications Device may securely share its secret with the passive RFID device in a manner similar to the way that engine controllers instantiate tokens and in a carefully controlled circumstance. The passive RFID device subsequently may communicate to a RFID reader both the passive RFID device's unique identifier number and the Active Communications Device's shared secret. The RFID reader may then trust communications with the Active Communications Device that identified itself with the same secret. Alternatively, the Active Communications Device could be certified by a payment authority entrusted to pass RFID information for payment authorization.

In a second embodiment, an authenticated passive RFID device separately communicates to the RFID reader a secret. The RFID reader then can trust the Active Communications Device that knows the authenticated passive RFID device's secret. Based on the security model, the trust can be time limited (e.g. where the RFID reader will recognize the Active Communications Device only when the authenticated passive RFID device and C are used contemporaneously), or not.

EXAMPLE 3

Ad Hoc Linkage of Passive RFID Devices to Active Communications Devices

Linkage of a passive RFID device to an Active Communications Device by prior arrangement may be useful when that linkage is intended to be persistent. There are circumstances where such persistence is not desirable. For example, suppose in the future a driver rents a car and wishes to use his passive RFID token to pay tolls. Rental cars are used by many different people, persistent linkage of RFID devices personal to drivers present problems for such temporary connections. One means to provide for payment of tolls would be to take advantage of the driver's payment capability, by simply using a car's transmitter to broadcast that capability to the toll collectors. The system would work so long as the car validates the drivers ability to pay and is trusted as a payment agent or the transmitter can directly pass the driver's credentials.

Small, relatively inexpensive toll tags permit cars to be recognized and charged for tolls while traveling as fast as 200 MPH. Toll tags are active RFID devices, with batteries and the ability to transmit signals. Across the country, there are a plethora of divergent toll tag protocols that are not interoperable. It would be cheap and easy to build a single, multi-purpose electronic device to permit cars to communicate with all the various toll tag readers. If the car could authenticate a driver's ability to pay, drivers might travel across the country without ever stopping to pay cash for tolls.

Prior Registration with Toll Authorities.

Drivers could individually register with each different toll authority, or execute a single, multi-registration that covers many toll authorities. The toll registration could provide for a single stored value account, which would automatically be debited by each of the various toll authorities and topped-up using a single source of payment. The payment account could be linked to a single RFID device.

For each car enabled with the universal toll transmitter, drivers could authenticate themselves with their personal RFID token, and proceed through the speedier toll tag lines, no muss no fuss. Since most new cars already have RFID readers, it would be quite easy to enable a second site convenient to permit drivers to authenticate their passive RFID devices.

Ad Hoc Payment of Tolls.

If a passive RFID device has a broadly accepted payment mechanism attached, sometimes prior registration with the toll authorities might be avoided. The toll collector could optimistically accept the RFID number, and seek payment. Photographing the license plate or some similar mechanism could provide anti-fraud protection.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

While the invention has been particularly shown and described within the framework of performing purchase transactions using a token from an automobile, it will be appreciated that variations and modifications can be effected by a person of ordinary skill in the art without departing from the scope of the invention. For example, one of ordinary skill in the art will recognize that various types of tokens may be used to perform purchase transactions and that other types of transactions may also be performed using a token. Furthermore, one of ordinary skill in the art will recognize that such processes and systems do not need to be restricted to the specific embodiments described herein.

The invention claimed is:

1. A method for performing at least one payment transaction comprising:

registering, by a central controller comprising at least one computer processor, a Radio Frequency Identification (RFID) token of a consumer and a financial account of the consumer, said registering comprising:
receiving, via a register station, a unique identifier of the RFID token;
receiving, via the register station, account information for the financial account;
validating the consumer;
listing the RFID token as a trusted authenticated RFID token permitted to perform transactions; and
storing the unique identifier of the RFID token in association with the financial account so that the financial account can be used to perform said transactions using the unique identifier of the RFID token;
transferring, via the central controller, trust associated with the trusted authenticated RFID token to an active communications device (ACD) for a limited time period, said transferring comprising:
securely sharing, by the ACD, a secret of the ACD with the trusted authenticated RFID token;
receiving from the trusted authenticated RFID token, via the register station, both the unique identifier of the trusted authenticated RFID token and the shared secret of the ACD; and
storing the shared secret of the ACD in association with the trusted authenticated RFID token so that the ACD is permitted to perform said transactions, as a trusted ACD, on behalf of the trusted authenticated RFID token for the limited time period; and
subsequent to said registering and said transferring and within the limited time period, performing at least one payment transaction using the trusted ACD, said performing comprising:
communicating, by the trusted ACD, the secret shared with the trusted authenticated RFID token to a RFID reader of a payee;
verifying, by the central controller, that the communicated secret is the shared secret of the ACD stored in association with the trusted authenticated RFID token; and
if verified, making payment to the payee for a transaction amount from the financial account to a payee account.

2. The method of claim 1, wherein the register station is located at a bank, an office or a store.

3. The method of claim 1, wherein the RFID token is a passive device.

4. The method of claim 1, wherein the RFID token is an active device.

5. The method of claim 1, wherein the financial account is a stored value account, a debit account, or a credit card account.

6. The method of claim 1, wherein the RFID token is a key of a particular automobile.

7. The method of claim 6, wherein validating the consumer comprises:
confirming with a department of motor vehicles that the consumer is an owner of the particular automobile.

8. The method of claim 1, wherein validating the consumer comprises:
receiving from the consumer a consumer signature or a temporary PIN that was mailed to the consumer.

9. The method of claim 1, wherein the ACD is a cellular phone, a computer, or a personal digital assistant.

10. The method of claim 1, wherein the ACD is an engine controller of an automobile.

11. The method of claim 1, wherein the ACD is a toll transmitter that is accepted by a plurality of toll authorities.

12. The method of claim 1, wherein the ACD is a toll transmitter, the payee is a toll authority, and the transaction amount is a toll payment amount.

* * * * *